(12) United States Patent
Choi et al.

(10) Patent No.: US 11,017,598 B2
(45) Date of Patent: May 25, 2021

(54) METHOD FOR PROCESSING OMNI-DIRECTIONAL IMAGE USING PADDING AREA AND APPARATUS SUPPORTING THE SAME

(71) Applicant: Samsung Electronics Co., Ltd., Suwon-si (KR)

(72) Inventors: Byung-Po Choi, Suwon-si (KR); In-Su Yu, Seoul (KR); Jin-Ho Lim, Suwon-si (KR); Il-Hoe Jung, Seoul (KR); David Bernardino Martins Sena, Staines (GB); Frederic Garnier, Maida Vale (GB); Yoon-Joo Kim, Seoul (KR); Jung-Eun Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/342,392

(22) PCT Filed: Oct. 18, 2017

(86) PCT No.: PCT/KR2017/011552
§ 371 (c)(1),
(2) Date: Apr. 16, 2019

(87) PCT Pub. No.: WO2018/074850
PCT Pub. Date: Apr. 26, 2018

(65) Prior Publication Data
US 2020/0058165 A1    Feb. 20, 2020

(30) Foreign Application Priority Data

Oct. 18, 2016    (KR) .......................... 10-2016-0135032

(51) Int. Cl.
*G06T 17/30*    (2006.01)
*G06T 1/20*     (2006.01)
(Continued)

(52) U.S. Cl.
CPC ................ *G06T 17/30* (2013.01); *G06T 1/20* (2013.01); *G06T 5/50* (2013.01); *G06T 1/0007* (2013.01)

(58) Field of Classification Search
None
See application file for complete search history.

(56) References Cited

U.S. PATENT DOCUMENTS 9,473,758 B1 * 10/2016 Long ..................... A63F 13/497
2014/0218354 A1 * 8/2014 Park, II .................. G06T 19/00
345/419

(Continued)

FOREIGN PATENT DOCUMENTS

KR    10-2012-0137607 A    12/2012
KR    10-2015-0003576 A    1/2015
(Continued)

OTHER PUBLICATIONS

Thomas Engelhardt; Octahedron Environment Maps. 2008.

*Primary Examiner* — Jason A Pringle-Parker
(74) *Attorney, Agent, or Firm* — Jefferson IP Law, LLP

(57) ABSTRACT

An image processing apparatus is disclosed. The image processing apparatus comprises: a receiver configured to receive an input frame including a plurality of image regions, corresponding to a plurality of faces of a three-dimensional polyhedron, and metadata; and a processor configured to render an output frame including at least one a part of the input frame, on the basis of padding information included in the metadata. Here, the processor may be configured to identify, on the basis of the padding information, a padding region included in at least one of the plurality of image regions, and render, on the basis of the determined padding region, a boundary between at least one face of the (Continued)

plurality of faces and another face of the plurality of faces adjoining the at least one face of the polyhedron.

7 Claims, 37 Drawing Sheets

(51) Int. Cl.
    *G06T 5/50*          (2006.01)
    *G06T 1/00*          (2006.01)

(56) References Cited

U.S. PATENT DOCUMENTS

| | | |
|---|---|---|
| 2015/0002641 A1 | 1/2015 | Kim |
| 2016/0112704 A1 | 4/2016 | Grange et al. |
| 2016/0112713 A1 | 4/2016 | Russell |
| 2017/0094262 A1* | 3/2017 | Peterson ............... G06T 19/006 |
| 2017/0200255 A1* | 7/2017 | Lin ........................... G06T 7/90 |
| 2017/0244775 A1* | 8/2017 | Ha ............................ G06T 1/20 |
| 2017/0339392 A1* | 11/2017 | Forutanpour ...... H04N 5/23238 |
| 2017/0358126 A1 | 12/2017 | Lim et al. |
| 2018/0192075 A1* | 7/2018 | Chambers .............. H04N 19/59 |

FOREIGN PATENT DOCUMENTS

| | | |
|---|---|---|
| KR | 10-1639275 B1 | 7/2016 |
| KR | 10-2017-0141081 A | 12/2017 |
| WO | 2016-076680 A1 | 5/2016 |

* cited by examiner

METHOD FOR PROCESSING OMNI-DIRECTIONAL IMAGE USING PADDING AREA AND APPARATUS SUPPORTING THE SAME

CROSS-REFERENCE TO RELATED APPLICATION(S)

This application is a U.S. National Stage application under 35 U.S.C. § 371 of an International application number PCT/KR2017/011552, filed on Oct. 18, 2017, which is based on and claimed priority of a Korean patent application number 10-2016-0135032, filed on Oct. 18, 2016, in the Korean Intellectual Property Office the disclosure of which is incorporated by reference herein in its entirety.

BACKGROUND

1. Field

The disclosure generally relates to an apparatus and a method for processing an image and, more particularly, to an image processing apparatus and an image processing method for rendering an image.

2. Description of Related Art

An omni-directional image camera system refers to a camera system capable of capturing images in omni-directions at 360 degrees from a fixed point of sight. The omni-directional image is an image including all of views from a viewer spinning in place and views from a viewer tilting his/her head back or lowering his/her head. The omni-directional image camera system installs a special mirror such as a hyperbolic mirror or a special lens such as a fisheye lens in a camera or uses a plurality of cameras to capture images in omni-directions.

Research on omni-directional video coding to transmit image information generated by the omni-directional image camera system to another electronic device or store the same in an internal or an external recording medium has been actively conducted.

Particularly, methods of more efficiently compressing omni-directional images (three-dimensional images) using a video codec such as MPEG-4 or H.264 have been researched. Representatively, there is a method of reducing an amount of data on a compressed image by mapping the three-dimensional omni-directional image to a two-dimensional image (plane image). The method of mapping the omni-directional image includes, for example, a cartographical projection method or a polygonal projection method of performing two-dimensional plane mapping in consideration of camera attributes such as calibration parameters.

According to the above description, a three-dimensional spatial image may be converted into a plurality of two-dimensional images through a mapping process. In this case, an output end of the image passes through a process of concatenating and rendering the plurality of two-dimensional images.

However, due to discontinuity between the plurality of two-dimensional images during the process of concatenating the plurality of two-dimensional images, the rendering result may not be smooth.

SUMMARY

The disclosure has been made to solve the problem and an aspect of the disclosure is to provide an image processing device and an image processing method for minimizing distortion of an image when processing omni-directional images.

Another aspect of the disclosure is to provide an image processing device and an image processing method for processing omni-directional images while maintaining Quality of Service (QoS).

In accordance with an aspect of the disclosure, an apparatus for processing an image includes: a receiver configured to receive an input frame including a plurality of image areas corresponding to respective faces of a polyhedron and metadata; and a processor configured to render an output frame including at least part of the input frame on the basis of padding information included in the metadata, wherein the processor determines a padding area included in at least one of the plurality of image areas on the basis of the padding information and renders a boundary between at least one face of the polyhedron and another face of the polyhedron concatenated with the at least one face, based on the determined padding area.

In accordance with another aspect of the disclosure, an apparatus for processing an image includes: a storage unit configured to store an input frame and metadata; and a processor configured to generate an output frame including at least one of a plurality of image areas to which images of respective faces of a polyhedron are mapped on the basis of the input frame and the metadata and control the storage unit to store the generated output frame, wherein the processor generates at least one padding area on the basis of padding information included in the metadata and inserts the at least one generated padding area into at least one of the plurality of image areas to generate the output frame.

In accordance with another aspect of the disclosure, a method of processing an image includes: receiving an input frame including a plurality of image areas corresponding to respective faces of a polyhedron and metadata; and rendering an output frame including at least part of the input frame, based on padding information included in the metadata. The rendering may include determining a padding area included in at least one of the plurality of image areas, based on the padding information and rendering a boundary between at least one face of the polyhedron and another face of the polyhedron concatenated with the at least one face on the basis of the determined padding area.

In accordance with another aspect of the disclosure, a method processing an image may include: receiving an input frame and metadata; and generating an output frame including at least one of a plurality of image areas to which images of respective faces of a polyhedron are mapped, based on the input frame and the metadata The generating may include generating at least one padding area, based on padding information included in the metadata and inserting the at least one generated padding area into at least one of the plurality of image areas to generate the output frame.

As described above, according to the disclosure, it is possible to minimize distortion of an image in processing of omni-directional images.

DETAILED DESCRIPTION

Figure 1:
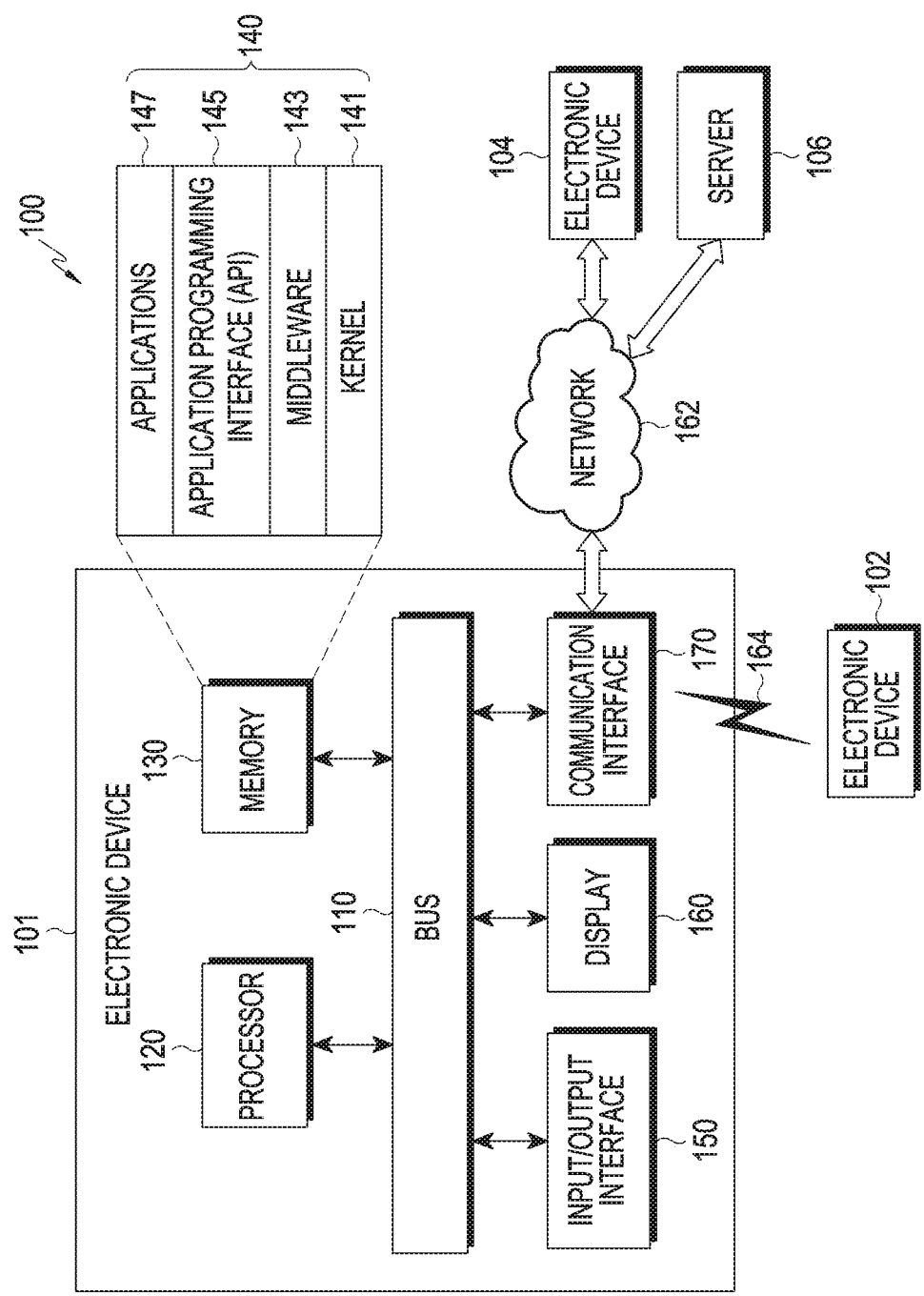
FIG. 1 illustrates a network environment according to various embodiments of the disclosure.

Hereinafter, various embodiments of the disclosure will be described with reference to the accompanying drawings. However, it should be understood that there is no intent to limit the disclosure to the particular forms disclosed herein; rather, the disclosure should be construed to cover various modifications, equivalents, and/or alternatives of embodiments of the disclosure. In describing the drawings, similar reference numerals may be used to designate similar constituent elements.

As used herein, the expression "have", "may have", "include", or "may include" refers to the existence of a corresponding feature (e.g., numeral, function, operation, or constituent element such as component), and does not exclude one or more additional features.

In the disclosure, the expression "A or B", "at least one of A and/or B", or "one or more of A and/or B" may include all possible combinations of the items listed. For example, the expression "A or B", "at least one of A and B", or "at least one of A or B" may include (1) at least one A, (2) at least one B, or (3) both at least one A and at least one B.

The expression "a first", "a second", "the first", or "the second" used in various embodiments of the disclosure may modify various components regardless of the order and/or the importance but does not limit the corresponding components. For example, a first user device and a second user device indicate different user devices although both of them are user devices. For example, a first element may be termed a second element, and similarly, a second element may be termed a first element without departing from the scope of the disclosure.

It should be understood that when an element (e.g., first element) is referred to as being (operatively or communicatively) "connected," or "coupled," to another element (e.g., second element), it may be directly connected or coupled directly to the other element or any other element (e.g., third element) may be interposed between them. In contrast, it may be understood that when an element (e.g., first element) is referred to as being "directly connected," or "directly coupled" to another element (second element), there is no element (e.g., third element) interposed between them.

As used herein, the expression "configured to" may be interchangeably used with the expression "suitable for", "having the capability to", "designed to", "adapted to", "made to", or "capable of". The term "configured to" may not necessarily imply "specifically designed to" in hardware. Alternatively, in some situations, the expression "device configured to" may mean that the device, together with other devices or components, "is able to". For example, the phrase "processor adapted (or configured) to perform A, B, and C" may mean a dedicated processor (e.g., embedded processor) only for performing the corresponding operations or a generic-purpose processor (e.g., Central Processing Unit (CPU) or Application Processor (AP)) that can perform the corresponding operations by executing one or more software programs stored in a memory device.

The terms used in the disclosure are only used to describe specific embodiments, and are not intended to limit the disclosure. A singular expression may include a plural expression unless they are definitely different in a context. Unless defined otherwise, all terms used herein, including technical and scientific terms, have the same meaning as those commonly understood by a person skilled in the art to which the disclosure pertains. Such terms as those defined in a generally used dictionary may be interpreted to have the meanings equal to the contextual meanings in the relevant field of art, and are not to be interpreted to have ideal or excessively formal meanings unless clearly defined in the disclosure. In some cases, even the term defined in the disclosure should not be interpreted to exclude embodiments of the disclosure.

An electronic device according to various embodiments of the disclosure may include at least one of, for example, a smart phone, a tablet Personal Computer (PC), a mobile phone, a video phone, an electronic book reader (e-book reader), a desktop PC, a laptop PC, a netbook computer, a workstation, a server, a Personal Digital Assistant (PDA), a Portable Multimedia Player (PMP), a MPEG-1 audio layer-3 (MP3) player, a mobile medical device, a camera, and a wearable device. According to various embodiments, the wearable device may include at least one of an accessory type (e.g., a watch, a ring, a bracelet, an anklet, a necklace, a pair of glasses, a contact lens, or a Head-Mounted Device (HMD)), a fabric or clothing integrated type (e.g., an electronic clothing), a body-mounted type (e.g., a skin pad, or tattoo), and a bio-implantable type (e.g., an implantable circuit).

According to some embodiments, the electronic device may be a home appliance. The home appliance may include at least one of, for example, a television, a Digital Video Disk (DVD) player, an audio player, a refrigerator, an air conditioner, a vacuum cleaner, an oven, a microwave oven, a washing machine, an air cleaner, a set-top box, a home automation control panel, a security control panel, a TV box (e.g., Samsung HomeSync™, Apple TV™, or Google TV™), a game console (e.g., Xbox™ and PlayStation™), an electronic dictionary, an electronic key, a camcorder, and an electronic photo frame.

According to another embodiment, the electronic device may include at least one of various medical devices (e.g., various portable medical measuring devices (a blood glucose monitoring device, a heart rate monitoring device, a blood pressure measuring device, a body temperature measuring device, etc.), a Magnetic Resonance Angiography (MRA), a Magnetic Resonance Imaging (MRI), a Computed Tomography (CT) machine, and an ultrasonic machine), a navigation device, a Global Positioning System (GPS) receiver, an Event Data Recorder (EDR), a Flight Data Recorder (FDR), a Vehicle Infotainment Devices, an electronic device for a ship (e.g., a navigation device for a ship, and a gyro-compass), avionics, security devices, an automotive head unit, a robot for home or industry, an Automatic Teller's Machine (ATM) in banks, a Point Of Sale (POS) in a shop, or internet device of things (e.g., a light bulb, various sensors, electric or gas meter, a sprinkler device, a fire alarm, a thermostat, a streetlamp, a toaster, a sporting goods, a hot water tank, a heater, a boiler, etc.).

According to some embodiments, the electronic device may include at least one of a part of furniture or a building/structure, an electronic board, an electronic signature receiving device, a projector, and various kinds of measuring instruments (e.g., a water meter, an electric meter, a gas meter, and a radio wave meter). The electronic device according to various embodiments of the disclosure may be a combination of one or more of the aforementioned various devices. The electronic device according to some embodiments of the disclosure may be a flexible device. Further, the electronic device according to an embodiment of the disclosure is not limited to the aforementioned devices, and may include a new electronic device according to the development of technology.

Various embodiments proposed by the disclosure propose a method of transmitting and receiving an omni-directional image mapped to a two-dimensional image through a multi-channel in order to efficiently transmit and receive the omni-directional image.

Hereinafter, an electronic device according to various embodiments will be described with reference to the accompanying drawings. In the disclosure, the term "user" may refer to a person using an electronic device or a device (for example, an artificial intelligence electronic device) using an electronic device.

FIG. 1 illustrates a network environment 100 according to various embodiments of the disclosure.

Referring to FIG. 1, an electronic device 101 within the network environment 100 may include a bus 110, a processor 120, a memory 130, an image processing module 140, an input/output interface 150, a display 160, and a communication interface 170. According to an embodiment, the electronic device 101 may omit at least one of the elements, or may further include other elements.

The bus 110 may include, for example, a circuit for connecting the elements 120 to 170 and transmitting a communication signal (for example, a control message and/or data) between the elements 120 to 170.

The processor 120 may include one or more of a Central Processing Unit (CPU), an Application Processor (AP), a Communication Processor (CP), or an Image Signal Processor (ISP). The processor 120 may control, for example, one or more different elements of the electronic device 101, perform image signal processing, and/or process calculations or data related to communication.

When the ISP is included in the processor 120, the processor 120 may acquire an omni-directional image from the memory 130, an external electronic device, or an interval camera (not shown). In this case, the processor 120 may map the omni-directional image to a two-dimensional image (or image frame) through, for example, an Octahedron Projection (OHP) scheme. The two-dimensional image may include a plurality of image areas having preset array attributes. The array attributes may be attributes indicating a mapping relation between each face (or an image of each face) of a three-dimensional polyhedron and each of a plurality of image areas.

In this case, the processor 120 may insert a padding area (hereinafter, the padding area is defined to mean the same as a padding image area) into the image area. When rendering is performed on the basis of the two-dimensional image to which the omni-directional image is mapped, the padding area may be an image area which is the basis of (or used for) rendering of a boundary part between a plurality of images areas included in the two-dimensional image. For example, on the basis of at least part of a target image or at least part of an adjacent image of the target image, the processor 120 may fill a padding area of the target image with information.

In another example, the processor 120 may fill the padding area of the target image with information using a preset pixel value. In another example, the processor 120 may interpolate a plurality of image areas or adjacent areas of the plurality of image area and fill padding areas of the plurality of image areas with information.

When an omni-directional image is mapped, the processor 120 may add a padding area to an original image of the omni-directional image.

According to an embodiment, the processor 120 may generate a padding area and insert or attach the padding area to at least one of the plurality of image areas included in the two-dimensional image to which the omni-directional image is mapped.

According to another embodiment, when each face of a polyhedron to which the omni-directional image is mapped is mapped to the two-dimensional image, the processor 120 may generate a padding area and insert or attach the padding area to an image of each face of the polyhedron.

The processor 120 may use padding information in order to generate the padding area. The padding information may include a padding size and an image resolution.

Meanwhile, the processor 120 may perform rendering based on the two-dimensional image to which the omni-directional image is mapped. The two-dimensional image to which the omni-directional image is mapped may be image data pre-stored in the memory 130 or received by the communication interface 170.

In this case, the processor 120 may perform rendering based on padding information. The padding information may be pre-stored in the memory 130 or received from the communication interface 170.

According to an embodiment, the processor 120 may determine a padding area included in at least one of a plurality of image areas included in a two-dimensional image on the basis of padding information and render a boundary between one face of a polyhedron to which at least one of the plurality of image areas is mapped and another face of the polyhedron concatenated with the one face on the basis of the determined padding area.

The memory 130 may include volatile and/or non-volatile memory. The memory 130 may store, for example, instructions or data relevant to at least one other element of the electronic device 101. According to various embodiments, the memory 130 may store software and/or a program 140. The program 140 may include, for example, a kernel 141, middleware 143, an Application Programming Interface (API) 145, and/or applications (or "apps") 147. At least some of the kernel 141, the middleware 143, or the API 145 may be referred to as an Operating System (OS).

According to various embodiments, the memory 130 may store metadata and/or compressed or non-compressed image data in an area designated by the processor 120. For example, the memory 130 may store metadata as at least part of the target image.

The memory 130 may read an image (for example, the two-dimensional image to which the omni-directional image is mapped or raw data of the omni-directional image) and/or metadata stored in the designated area in response to a request from the processor 120 and provide the same to the processor 120.

When the processor 120 does not include the ISP, the electronic device 101 may separately include the image processing module 140. In this case, the image processing module 140 may perform the operation of the processor 120 on behalf of the processor 120.

The image processing module may be an element independent from the processor 120 and the memory 130. However, various embodiments are not limited thereto. The image processing module may be integrated with, for example, the processor 120 or stored in the memory 130 in the form of software and may be executed by the processor 120. Further, the image processing module may be implemented in, for example, the processor 120 and the memory 130 in a distributed manner. The image processing module may perform an operation of generating metadata or mapping an omni-directional image to a two-dimensional image.

The kernel 141 may control or manage system resources (for example, the bus 110, the processor 120, or the memory 130) used for executing an operation or function implemented by other programs (for example, the middleware 143, the API 145, or the application 147). Furthermore, the kernel 141 may provide an interface through which the middleware 143, the API 145, or the application programs 147 may access the individual elements of the electronic device 101 to control or manage the system resources.

The middleware 143 may function as, for example, an intermediary for allowing the API 145 or the application programs 147 to communicate with the kernel 141 to exchange data.

Furthermore, the middleware 143 may process one or more task requests, which are received from the application programs 147, according to priorities thereof. For example, the middleware 143 may assign priorities for using the system resources (for example, the bus 110, the processor 120, the memory 130, or the like) of the electronic device 101, to at least one of the application programs 147. For example, the middleware 143 may perform scheduling or load balancing for one or more task requests by processing the one or more task requests according to priorities assigned to at least one application.

The API 145 is an interface through which the applications 147 control functions provided from the kernel 141 or the middleware 143, and may include, for example, at least one interface or function (for example, instruction) for file control, window control, image processing, or text control.

The input/output interface 150 may function as, for example, an interface that can forward instructions or data, which are input from a user or an external device, to the other element(s) of the electronic device 101. Furthermore, the input/output interface 150 may output commands or data received from the other element(s) of the electronic device 101 to a user or an external device. For example, the input/output interface 150 may include a plurality of image sensors having different characteristics. The input/output interface 150 may transfer images photographed by the plurality of image sensors to the image processing module, the memory 130, the display 160, and the communication interface 170 through the bus 110. The photographed images may have different image characteristics. This may be due to a difference in the image sensor characteristic or a condition set for the photographing.

The display 160 may include, for example, a liquid-crystal display (LCD), a light-emitting diode display (LED), an organic light-emitting diode display (OLED), a micro-electro-mechanical systems (MEMS) display, or an electronic paper display. The display 160 may display, for example, a rendered output frame or a preview image.

The communication interface 170 may establish, for example, communication between the electronic device 101 and an external device (for example, a first external electronic device 102, a second external electronic device 104, or a server 106). For example, the communication interface 170 may be connected to a network 162 through wireless or wired communication to communicate with the external device (for example, the second external electronic device 104 or the server 106).

The wireless communication may use at least one of, for example, long-term evolution (LTE), LTE-advanced (LTE-A), code division multiple access (CDMA), wideband CDMA (WCDMA), universal mobile telecommunications system (UMTS), WiBro (wireless broadband), global system for mobile communications (GSM), or the like, as a cellular communication protocol. Further, the wireless communication may include, for example, short-range communication. The short-range communication may include at least one of, for example, Wireless Fidelity (Wi-Fi), Bluetooth, Near Field Communication (NFC), Magnetic Stripe Transmission (MST), or Zigbee. The wireless communication may use, for example, a Global Positioning System (GPS) or a Global Navigation Satellite System (GNSS). The wired communication may include, for example, at least one of a Universal Serial Bus (USB), a High Definition Multimedia Interface (HDMI), Recommended Standard-232 (RS-232), and a Plain Old Telephone Service (POTS).

The network 162 may include at least one of a communication network such as a computer network (for example, a LAN or a WAN), the Internet, and a telephone network.

Each of the first and second external electronic devices 102 and 104 may be of the same or a different type from the electronic device 101. According to various embodiments, the server 106 may include a group of one or more servers.

According to various embodiments, all or some of the operations performed in the electronic device 101 may be performed in another electronic device or a plurality of electronic devices (for example, the electronic devices 102 and 104 or the server 106).

According to various embodiments, when the electronic device 101 has to perform a function or service automatically or in response to a request, the electronic device 101 may request another device (for example, the electronic device 102 or 104, or the server 106) to perform at least some functions relating thereto, instead of autonomously or additionally performing the function or service. Another electronic device (for example, the electronic device 102 or 104, or the server 106) may execute the requested functions or the additional functions, and may deliver information about the result of the execution to the electronic device 101. In this case, the electronic device 101 may provide the received result as it is, or may additionally process the received result to provide the requested functions or services. To this end, for example, cloud-computing, distributed-computing, or client-server-computing technology may be used.

Figure 2:
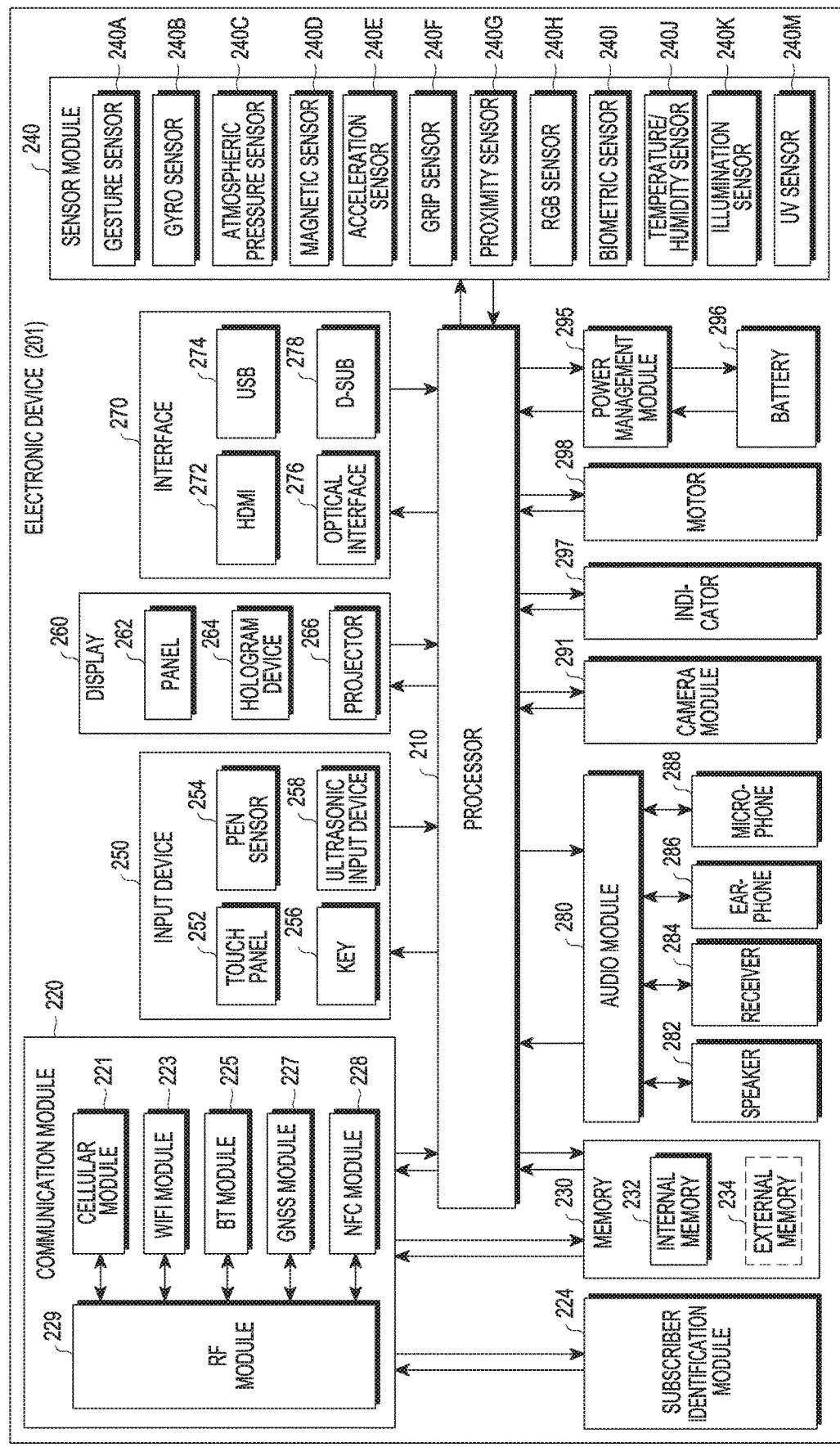
FIG. 2 illustrates the configuration of an electronic device according to various embodiments of the disclosure.

FIG. 2 illustrates the configuration of an electronic device 201 according to various embodiments of the disclosure.

Referring to FIG. 2, the electronic device 201 may include, for example, the entirety or part of the electronic device 101 illustrated in FIG. 1. The electronic device 201 may include at least one Application Processor (AP) 210, a communication module 220, a Subscriber Identification Module (SIM) card 224, a memory 230, a sensor module 240, an input device 250, a display 260, an interface 270, an audio module 280, a camera module 291, a power management module 295, a battery 296, an indicator 297, and a motor 298.

The processor 210 may control a plurality of hardware or software elements connected thereto and may perform various data processes and operations by driving an operating system or an application. The processor 210 may be embodied, for example, as a System on Chip (SoC). According to various embodiments, the processor 210 may further include a Graphic Processing Unit (GPU) and/or an image signal processor. The processor 210 may also include at least some of the elements illustrated in FIG. 2 (for example, a cellular module 221). The processor 210 may load, in a volatile memory, instructions or data received from at least one of the other elements (for example, a non-volatile memory), process the loaded instructions or data, and store the result data in the non-volatile memory.

According to various embodiments proposed by the disclosure, the processor 210 may perform all of the operations performed by the processor 120 and/or the image processing module described with reference to FIG. 1. Since a detailed description thereof is the same as that made with reference to FIG. 1, an overlapping description will be omitted.

The communication module 220 may have a configuration identical or similar to that of the communication interface 170 illustrated in FIG. 1. The communication module 220 may include, for example, a cellular module 221, a Wi-Fi module 223, a BT module 225, a GPS module 227, an NFC module 228, and a Radio Frequency (RF) module 229.

The cellular module 221 may provide, for example, a voice call, a video call, a text-message service, an Internet service, or the like via a communication network. According to various embodiments, the cellular module 221 may identify or authenticate an electronic device 201 in the communication network using a subscriber identification module (for example, a Subscriber Identity Module (SIM) card) 224. According to various embodiments, the cellular module 221 may perform at least some of the functions that the processor 210 may provide. According to various embodiments, the cellular module 221 may include a CP.

For example, each of the Wi-Fi module 223, the BT module 225, the GPS module 227, and the NFC module 228 may include a processor for processing data transmitted/received through the corresponding module. In some embodiments, at least some (two or more) of the cellular module 221, the Wi-Fi module 223, the Bluetooth module 225, the GNSS module 227, and the NFC module 228 may be included in a single Integrated Chip (IC) or IC package.

The RF module 229 may transmit/receive, for example, a communication signal (for example, an RF signal). The RF module 229 may include, for example, a transceiver, a power amplifier module (PAM), a frequency filter, a low-noise amplifier (LNA), an antenna, or the like. According to various embodiments, at least one of the cellular module 221, the Wi-Fi module 223, the BT module 225, the GPS module 227, and the NFC module 228 may transmit/receive an RF signal through a separate RF module.

According to various embodiments, the communication module 220 may perform the same operation performed by the communication interface 170 of FIG. 1. That is, the communication module 220 may make a request for compressing a target image to an external electronic device in response to the control of the processor 210. To this end, the communication module 220 may provide a target image (a two-dimensional image to which an omni-directional image is mapped) and/or metadata corresponding to the target image to the external electronic device. The communication module 220 may receive a compressed image provided from the external electronic device and transfer the received compressed image to the processor 210.

The subscriber identification module 224 may include, for example, a card that includes a subscriber identity module and/or an embedded SIM, and may contain unique identification information (for example, an Integrated Circuit Card Identifier (ICCID)) or subscriber information (for example, an International Mobile Subscriber Identity (IMSI)).

The memory 230 (for example, the memory 130) may include, for example, an internal memory 232 or an external memory 234. The memory 230 may record the target image and/or metadata corresponding to the target image in a predetermined area in response to the control of the processor 210. The memory 230 may read a particular target image and/or metadata corresponding to the particular target image in response to the control of the processor 210 and provide the read particular target image and/or metadata corresponding to the particular target image to the processor 210.

The internal memory 232 may include at least one of, for example, a volatile memory (for example, a Dynamic Random Access Memory (DRAM), a Static RAM (SRAM), a Synchronous Dynamic RAM (SDRAM), and the like) and a non-volatile memory (for example, a One Time Programmable Read Only Memory (OTPROM), a Programmable ROM (PROM), an Erasable and Programmable ROM (EPROM), an Electrically Erasable and Programmable ROM (EEPROM), a mask ROM, a flash ROM, a flash memory (for example, a NAND flash memory or a NOR flash memory), a hard disc drive, a Solid State Drive (SSD), and the like).

The external memory 234 may further include a flash drive, for example, a compact flash (CF), a secure digital (SD), a micro secure digital (Micro-SD), a mini secure digital (Mini-SD), an eXtreme digital (xD), a multi-media card (MMC), a memory stick, or the like. The external memory 234 may be functionally and/or physically connected to the electronic device 201 through various interfaces.

The sensor module 240 may measure, for example, a physical quantity or detect the operating state of the electronic device 201 and may convert the measured or detected information into an electrical signal. The sensor module 240 may include, for example, at least one of a gesture sensor 240A, a gyro sensor 240B, an atmospheric pressure sensor 240C, a magnetic sensor 240D, an acceleration sensor 240E, a grip sensor 240F, a proximity sensor 240G, a color sensor 240H (for example, a red, green, blue (RGB) sensor), a biometric sensor 240I, a temperature/humidity sensor 240J, an illumination sensor 240K, and a ultraviolet (UV) sensor 240M. Additionally or alternatively, the sensor module 240 may include, for example, an E-nose sensor, an electromyography (EMG) sensor, an electroencephalogram (EEG) sensor, an electrocardiogram (ECG) sensor, an Infrared (IR) sensor, an iris sensor, and/or a fingerprint sensor. The sensor module 240 may further include a control circuit for controlling one or more sensors included therein. In some embodiments, the electronic device 201 may further include a processor, which is configured to control the sensor module 240, as a part of the processor 210 or separately from the processor 210, in order to control the sensor module 240, while the processor 210 is in a sleep state.

The input device 250 may include, for example, a touch panel 252, a (digital) pen sensor 254, a key 256, or an ultrasonic input device 258. The touch panel 252 may use, for example, at least one of a capacitive type, a resistive type, an infrared type, and an ultrasonic type. Furthermore, the touch panel 252 may further include a control circuit. The touch panel 252 may further include a tactile layer and may provide a tactile response to the user.

The (digital) pen sensor 254 may include, for example, a recognition sheet which is part of a touch panel or is separated from a touch panel. The key 256 may include, for example, a physical button, an optical key, or a keypad. The ultrasonic input device 258 may detect ultrasonic waves, which are generated by an input tool, through a microphone 288 and may identify data corresponding to the detected ultrasonic waves.

The display 260 may include a panel 262, a hologram device 264, or a projector 266.

The panel 262 may have a configuration that is the same as, or similar to, that of the display 160 illustrated in FIG. 1. The panel 262 may be implemented to be, for example, flexible, transparent, or wearable. The panel 262 and the touch panel 252 may be configured as a single module. According to various embodiments, the panel 262 may include at least one sensor. For example, the panel 262 may include a pressure sensor (or a force sensor (interchangeably used hereinafter)). The pressure sensor may be a sensor which can measure the strength of pressure of a user's touch. The pressure sensor may be implemented in an integrated form with the touch panel 252 or as one or more sensors separately from the touch panel 252.

The hologram device 264 may show a three-dimensional image in the air using light interference. The projector 266 may display an image by projecting light onto a screen. The screen may be located, for example, in the interior of, or on the exterior of, the electronic device 201. According to various embodiments, the display 260 may further include a control circuit for controlling the panel 262, the hologram device 264, or the projector 266.

The interface 270 may include, for example, a high-definition multimedia interface (HDMI) 272, a universal serial bus (USB) 274, an optical interface 276, or a D-sub-miniature (D-sub) interface 278. The interface 270 may be included in, for example, the communication interface 170 illustrated in FIG. 1. Additionally or alternatively, the interface 270 may, for example, include a mobile high-definition link (MHL) interface, a secure digital (SD) card/multi-media card (MMC) interface, or an infrared data association (IrDA) standard interface.

The audio module 280 may convert, for example, sound into an electrical signal, and vice versa. At least some elements of the audio module 280 may be included, for example, in the input/output interface 150 illustrated in FIG. 1. The audio module 280 may process sound information that is input or output via, for example, a speaker 282, a receiver 284, earphones 286, the microphone 288, and the like.

The camera module 291 is, for example, a device which may photograph a still image and a video. According to various embodiments, the camera module 291 may include one or more image sensors (for example, a front sensor or a back sensor), a lens, an Image Signal Processor (ISP) or a flash (for example, LED or xenon lamp). That is, the camera module 291 may include a plurality of image sensors having different characteristics. The different characteristics are factors for determining characteristics of photographed images and may be characteristics for types of images (black and white or color), resolution, and view angle. The camera module 291 may photograph a 360-degree image through at least two optical lenses and generate a polyhedron image or a plane image on the basis of image data acquired through the photographing.

The power management module 295 may manage, for example, the power of the electronic device 201. According to various embodiments, the power management module 295 may include a Power Management Integrated Circuit (PMIC), a charger Integrated Circuit (IC), or a battery 296 or fuel gauge. The PMIC may use a wired and/or wireless charging method. The wireless charging method may include, for example, a magnetic-resonance method, a magnetic-induction method, an electromagnetic-wave method, and the like. Additional circuits (e.g., a coil loop, a resonance circuit, a rectifier, and the like) for wireless charging may be further included. The battery gauge may measure, for example, the amount of charge remaining in the battery 296 and a voltage, current, or temperature while charging. The battery 296 may include, for example, a rechargeable battery and/or a solar battery.

The indicator 297 may display a particular state, for example, a booting state, a message state, a charging state, or the like of the electronic device 201 or a part (for example, the processor 210) of the electronic device 201. The motor 298 may convert an electric signal into mechanical vibration, and may generate vibration, a haptic effect, or the like. Although not illustrated, the electronic device 201 may include a processing device (for example, a GPU) for supporting mobile TV. The processing device for supporting mobile TV may process, for example, media data according to a certain standard such as digital multimedia broadcasting (DMB), digital video broadcasting (DVB), or MediaFLO™.

Each of the above-described elements according to the disclosure may be configured with one or more components, and the names of the corresponding component elements may vary depending on the type of electronic device. According to various embodiments, the electronic device 201 may include at least one of the aforementioned elements described in the disclosure, and some elements may be omitted or additional other elements may be further included. Also, some elements of the electronic device according to various embodiments may be combined into one entity, which may perform functions identical to those of the corresponding elements before the combination.

Figure 3:
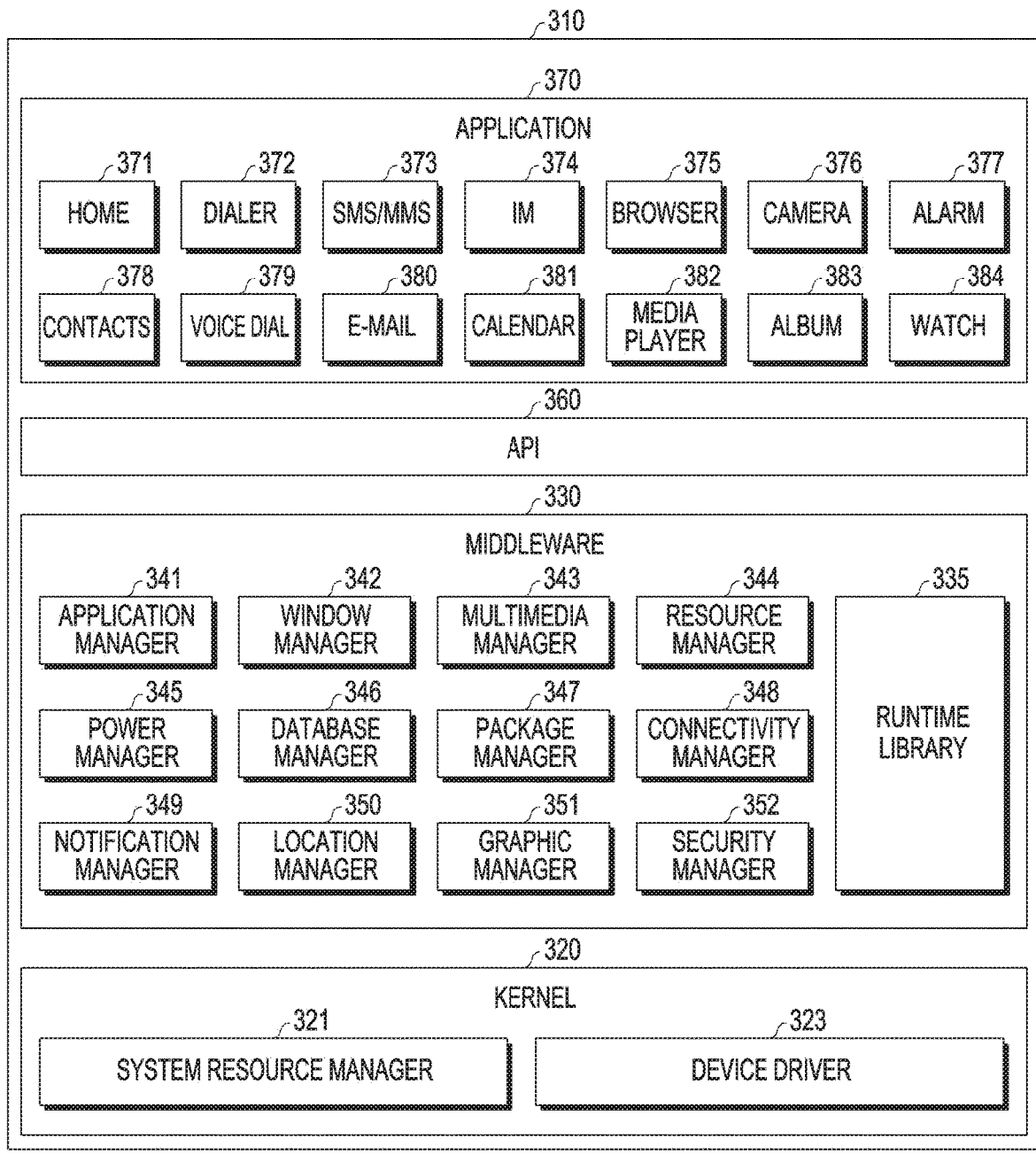
FIG. 3 illustrates the configuration of a program module according to various embodiments of the disclosure.

FIG. 3 illustrates the configuration of a program module according to various embodiments of the disclosure.

Referring to FIG. 3, a program module 310 (for example, the program 180) may include an Operating System (OS) for controlling resources related to the electronic device and/or various applications (for example, the applications 187) executed in the operating system. The operating system may be, for example, Android, iOS, Windows, Symbian, Tizen, Bada, and the like The program module 310 may include a kernel 320, middleware 330, an Application Programming Interface (API) 360, and/or an application 370. At least some of the program module 310 may be preloaded to the electronic device or may be downloaded from an external electronic device (for example, the electronic device 102 or 104 or the server 106).

For example, the kernel 320, the middleware 330, the API 360, and the application 370 included in the program module 310 may correspond to the kernel 141, the middleware 143, the API 145, and the application 147 included in the program 180 of FIG. 1

The kernel 320 may include, for example, a system resource manager 321 and/or a device driver 323. The system resource manager 321 may control, assign, or retrieve system resources. According to various embodiments, the system resource manager 321 may include a process management unit, a memory management unit, or a file system management unit. The device driver 323 may include, for example, a display driver, a camera driver, a Bluetooth driver, a shared memory driver, a USB driver, a keypad driver, a Wi-Fi driver, an audio driver, or an Inter-Process Communication (IPC) driver.

The middleware 330 may provide a function required by the applications 370 in common, or may provide various functions to the applications 370 via the API 360 so that the applications 370 may efficiently use the limited system resources within the electronic device. According to various embodiments, the middleware 330 (e.g., the middleware 143) may include, for example, at least one of a runtime library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, and a security manager 352.

The runtime library 335 may include, for example, a library module that a compiler uses in order to add a new function via a programming language while the applications 370 are being executed. The runtime library 335 may perform functions that are related to the management of input and output, the management of memory, arithmetic functions, and the like.

The application manager 341 may manage, for example, a life cycle of at least one application of the applications 370. The window manager 342 may manage GUI resources used for a screen. The multimedia manager 343 may identify formats required for reproducing various media files and may encode or decode a media file using a codec suitable for the corresponding format. The resource manager 344 may manage resources, such as source code, memory, storage space, and the like, of at least one of the applications 370.

The power manager 345 may operate together with, for example, a Basic Input/Output System (BIOS) to manage a battery or power, and may provide power information required for operating the electronic device. The database manager 346 may generate, search for, or change a database to be used by at least one of the applications 370. The package manager 347 may manage the installation or update of an application that is distributed in the form of a package file.

The connectivity manager 348 may manage wireless connection such as, for example, Wi-Fi or Bluetooth. The notification manager 349 may display or provide notification of an event, such as an arrival message, an appointment, a proximity notification, or the like, in such a manner as not to disturb a user. The location manager 350 may manage location information of the electronic device. The graphic manager 351 may manage graphic effects to be provided to a user and user interfaces related to the graphic effects. The security manager 352 may provide all security functions required for system security or user authentication. According to various embodiments, when the electronic device has a telephone call function, the middleware 330 may further include a telephony manager for managing a voice or a video call function of the electronic device.

The middleware 330 may include a middleware module including a combination of various functions of the aforementioned elements. The middleware 330 may provide a module specialized for each type of OS in order to provide a differentiated function. Also, the middleware 330 may dynamically delete some existing elements, or may add new elements.

The API 360 is, for example, a set of API programming functions, and may be provided with different configurations according to operating systems. For example, with respect to each platform, one API set may be provided in the case of Android or iOS, and two or more API sets may be provided in the case of Tizen.

The applications 370 may include, for example, one or more applications that can perform functions, such as a home application 371, dialer application 372, an SMS/MMS application 373, an Instant Message (IM) application 374, a browser application 375, a camera application 376, an alarm application 377, a contact application 378, a voice dial application 379, an e-mail application 380, a calendar application 381, a media player application 382, an album application 383, and a clock application 384. The applications 370 may include an application for performing a function, such as a health care application (for example, measuring an exercise quantity or blood sugar) or an environment information providing application (for example, providing atmospheric pressure, humidity, or temperature information).

According to various embodiments, the applications 370 may include an application (hereinafter, referred to as an "information exchange application" for convenience of description) supporting an information exchange between an electronic device (for example, the electronic device 101) and an external electronic device. The information exchange application may include, for example, a notification relay application for transferring predetermined information to an external electronic device or a device management application for managing an external electronic device.

For example, the notification relay application may include a function of transmitting notification information generated by another application (for example, an SMS/MMS application, an email application, a health management application, or an environmental information application) of the electronic device to an external electronic device. Furthermore, the notification relay application may receive, for example, notification information from an external electronic device and may provide the received notification information to a user.

The device management application may manage (for example, install, delete, or update), for example, at least one function of an external electronic device communicating with the electronic device (for example, a function of turning on/off the external electronic device itself (or some components thereof) or a function of controlling the luminance (or a resolution) of the display), applications operating in the external electronic device, or services provided by the external electronic device (for example, a telephone call service and a message service).

According to various embodiments, the applications 370 may include an application (for example, a health management application of a mobile medical device) designated according to attribute information of the external electronic device. According to various embodiments, the applications 370 may include applications received from an external electronic device. According to various embodiments, the applications 370 may include a preloaded application or a third-party application that may be downloaded from a server. The names of the elements of the program module 310, according to the embodiment illustrated in the drawing, may vary according to the type of operating system.

According to various embodiments, at least part of the program module 310 may be implemented as software, firmware, hardware, or a combination of two or more thereof. At least some of the program module 310 may be implemented (for example, executed) by, for example, the processor (for example, the processor 210). At least some of the program module 310 may include, for example, a module, a program, a routine, sets of instructions, a process, or the like for performing one or more functions.

The term "module" as used herein may, for example, mean a unit including one of hardware, software, and firmware or a combination of two or more of them. The "module" may be interchangeably used with, for example, the term "unit", "logic", "logical block", "component", or "circuit". The "module" may be a minimum unit of an integrated component element or a part thereof. The "module" may be a minimum unit for performing one or more functions or a part thereof. The "module" may be mechanically or electronically implemented. For example, the "module" according to the disclosure may include at least one of an Application-Specific Integrated Circuit (ASIC) chip, a Field-Programmable Gate Arrays (FPGA), and a programmable-logic device for performing operations which has been known or are to be developed hereinafter.

According to various embodiments, at least some of the devices (for example, modules or functions thereof) or the method (for example, operations) according to the disclosure may be implemented by a command stored in a computer-readable storage medium in a programming module form. The instruction, when executed by a processor (e.g., the processor 120), may cause the one or more processors to execute the function corresponding to the instruction. The computer-readable storage medium may be, for example, the memory 130.

The computer readable recoding medium may include a hard disk, a floppy disk, magnetic media (for example, a magnetic tape), optical media (for example, a Compact Disc Read Only Memory (CD-ROM) and a Digital Versatile Disc (DVD)), magneto-optical media (for example, a floptical disk), a hardware device (for example, a Read Only Memory (ROM), a Random Access Memory (RAM), a flash memory), and the like. In addition, the program instructions may include high class language codes, which can be executed in a computer by using an interpreter, as well as machine codes made by a compiler. The aforementioned hardware electronic device may be configured to operate as one or more software modules in order to perform the operation of the disclosure, and vice versa.

The programming module according to the disclosure may include one or more of the aforementioned components or may further include other additional components, or some of the aforementioned components may be omitted. Operations executed by a module, a programming module, or other component elements according to various embodiments of the disclosure may be executed sequentially, in parallel, repeatedly, or in a heuristic manner. Furthermore, some operations may be executed in a different order or may be omitted, or other operations may be added. Various embodiments disclosed herein are provided merely to easily describe technical details of the disclosure and to help the understanding of the disclosure, and are not intended to limit the scope of the disclosure. Therefore, it should be construed that all modifications and changes or modified and changed forms based on the technical idea of the disclosure fall within the scope of the disclosure.

Hereinafter, the disclosure will be described in more detail with reference to the accompanying drawings.

Figure 4:
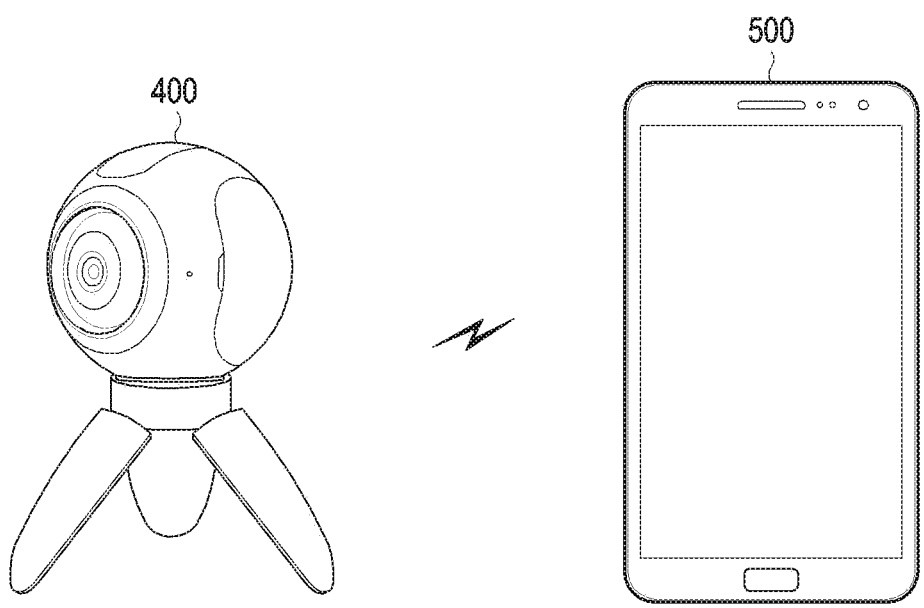
FIG. 4 illustrates an implementation example of an image processing system according to various embodiments of the disclosure.

FIG. 4 illustrates an implementation example of an image processing system according to various embodiments of the disclosure.

An image processing system 40 is a system for transmitting/receiving an omni-directionally captured image, performing rendering, and providing the image to the user.

Referring to FIG. 4, the image processing system 40 includes a first image processing device 400 and a second image processing device 500.

The first image processing device 400 may be a photographing device for taking an omni-directional image or a server for receiving the omni-directional image from the outside and processing the same. Of course, the disclosure is not limited thereto, and the first image processing device 400 may be implemented as the example of the electronic device.

According to an embodiment, the first image processing device 400 may be a photographing device 400.

The photographing device 400 captures an image omni-directionally. In general, it is not easy to capture an image omni-directionally through a single camera. Accordingly, the photographing device 400 may include a plurality of lenses or a plurality of cameras in order to capture the omni-directional image.

For example, a fisheye lens may have an angle of view wider than or equal to 180 degrees. That is, when the fisheye lens is put to face the sky, it is possible to capture an area from a constellation in the sky to the horizon within one image. The photographing device 400 may include a plurality of fisheye lenses and capture an image omni-directionally.

In another example, the photographing device 400 may include a plurality of cameras having a predetermined angle of view and capture an image omni-directionally. In this case, the plurality of cameras may be included in the photographing device 400 to cover the omni-direction based on one point.

In another example, the photographing device 400 including one or more cameras may move automatically and/or manually (in a direction of pitch, yaw, and roll) and capture images omni-directionally.

In another example, the photographing device 400 may include a plurality of cameras having a predetermined angle of view corresponding to user's left eye and right eye. In this case, the photographing device 400 may capture a stereoscopic image including a plurality of omni-directional images by capturing images omni-directionally. Examples of the photographing device 400 are not limited thereto.

Meanwhile, the photographing device 400 may capture not only the omni-direction images but also an image in some directions (for example, a rectangle area corresponding to 120 degrees upwardly, downwardly, leftwardly, and rightwardly based on the lens of the photographing device 400). Further, the photographing device 400 may capture omni-directional images, process the image in some directions among the omni-directional images, and transmit the image to the second image processing device 500.

Meanwhile, the photographing device 400 may perform recording such that the captured images and relevant metadata (for example, photographing direction, range, area, and location) are correlated with each other. In this case, the photographing device 400 may correlate at least one of metadata, that is, the camera location, motion information, and direction information received through a sensor (for example, a GPS sensor, a Wi-Fi fingerprint sensor, a gyro sensor, an acceleration sensor, and a geomagnetic sensor) with at least one of camera characteristic information (for example, camera calibration parameters and photographing state information) and the captured image.

Further, the photographing device 400 may map the captured omni-directional images to a two-dimensional plane image, encode the mapped two-dimensional plane image, and store the image in the memory or transmit the image to the second image processing device 500.

According to an embodiment, when the omni-directional images are mapped to a polyhedron including triangular sides, the mapped two-dimensional plane image may include an area obtained by arranging the triangular faces of the polyhedron on the two-dimensional plane surface.

According to an embodiment, the omni-directional image may be an image independent from the polyhedron associated with the two-dimensional plane image. For example, the omni-directional image may be an image mapped to the two-dimensional plane image through an Equirectangular Projection (ERP), a cube projection, or a cylindrical projection scheme. According to another embodiment, the omni-directional image may be an image associated with depth information determined through a distance sensor (for example, a Kinect™ camera, lidar, a stereo camera, or a laser distance measurement device).

According to another embodiment, the photographing device 400 may be a virtual camera at a predetermined location in a virtual reality space (for example, a 3D space in a game). In this case, the omni-directional image may be received image information associated with virtual objects within a virtual reality on the basis of characteristics of a virtual camera (for example, location, orientation, angle of view, and range). For example, in a game, an avatar's view may correspond to a Field of View (FoV) of a virtual camera, and an object image area within a virtual reality displayed therethrough may be part of the omni-directional image.

The photographing device 400 may generate a padding area. The photographing device 400 may generate a padding area on the basis of padding information.

Specifically, the photographing device 400 may generate a padding area including at least one of a plurality of image areas on the basis of padding information. Embodiments of a method of generating the padding area will be described below.

When the generated padding area is inserted into a plurality of image areas or mapped to the plurality of image areas, the photographing device 400 may simultaneously map the padding area at the same time.

The photographing device 400 may encode image data of a two-dimensional image including the plurality of image areas (including the padding area) and store the image data or transmit the same to the second image processing device 500.

According to another embodiment, the first image processing device 400 may be a server.

The server may process and transmit the pre-stored omni-directional image or ERP image.

According to an embodiment, the server may receive the omni-directional image or the ERP image from an external electronic device (for example, a camera or another server)

and store the same. In this case, the server may map the omni-directional image or the ERP image into the two-dimensional image.

According to an embodiment, when the omni-directional image or the ERP image is mapped to the two-dimensional image, the server may allocate the padding area to map the padding image.

According to another embodiment, when the omni-directional image or the ERP image is mapped to the two-dimensional image, the server may generate the padding area and insert the padding area into an original image of the mapped omni-directional image or ERP image or attach the padding area thereto.

According to an embodiment, the server may encode the mapped two-dimensional image and store the two-dimensional image or transmit the same to the second image processing device 500. An embodiment which is the same as the embodiment of the photographing device 400 described above may be also applied to the server. An overlapping description of the photographing device 400 will be omitted herein. Further, the omni-direction image may be a raw image captured omni-directionally by the camera, a virtual image, or an image obtained by mapping and encoding the raw image in various methods, but is not limited thereto.

The second image processing device 500 receives the two-dimensional image to which the omni-directional images are mapped and performs rendering.

Specifically, the second image processing device 500 may receive a bitstream of the mapped two-dimensional image from the first image processing device 400 and decode the same. The second image processing device 500 performs rendering using the decoded two-dimensional image and displays a rendered frame.

According to an embodiment, the second image processing device 500 may receive the whole omni-directional image mapped to the two-dimensional image (hereinafter, referred to as a mapped two-dimensional image). In this case, the second image processing device 500 may map the whole omni-directional image mapped in two dimensions to a virtual three-dimensional space and render an area corresponding to a user's Field of View (FoV).

According to another embodiment, the second image processing device 500 may receive only some of the mapped two-dimensional image through at least one transport channel.

The second image processing device 500 may perform rendering on the basis of a padding area. In this case, the image processing device 500 may determine the padding area on the basis of padding information.

According to an embodiment, when rendering one of a plurality of image areas included in a two-dimensional image and a plurality of other image areas concatenated therewith, the image processing device 500 may render a boundary between one of the plurality of image areas and the plurality of other image areas on the basis of a padding area included in one of the plurality of image areas and another padding area included in the plurality of other image areas concatenated therewith.

The second image processing device 500 may be various types of electronic devices for processing an image, for example, a Virtual Reality (VR) device such as a Head-Mounted Display (HMD), a mobile phone, a PC, a TV, or a tablet PC.

Hereinafter, an embodiment of a process in which the image processing system 40 processes an image will be described in detail.

Figure 5:
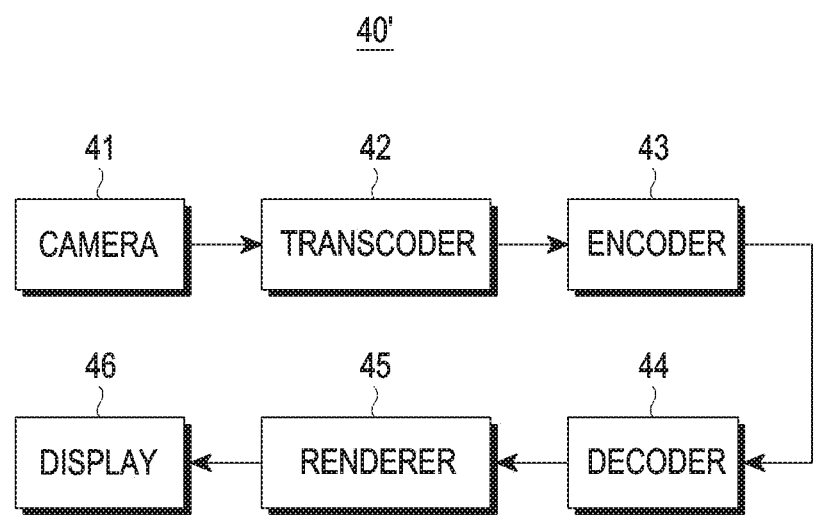
FIG. 5 is a block diagram illustrating a process in which the image processing system processes an image according to various embodiments of the disclosure.

FIG. 5 is a block diagram illustrating a process in which the image processing system processes an image according to various embodiments of the disclosure.

Referring to FIG. 5, the omni-directional image is sequentially processed by a camera 41, a transcoder 42, an encoder 43, a decoder 44, a renderer 45, and a display 46.

It is assumed that the camera 41, the transcoder 42, and the encoder 43 are elements included in a transmission end and the decoder 44, the renderer 45, and the display 46 are elements included in a reception end. For example, as illustrated in FIG. 4, the transmission end and the reception end may be implemented as the photographing device 400 and the image processing device 500, respectively. However, separation of the image processing system 40' into the transmission end and the reception end is only for convenience of description, and all of the respective elements of the image processing system 40' may be included in a single device or various combinations thereof may be included in another single device.

The camera 41 captures an omni-directional image. For example, when it is assumed that a pair of fisheye lenses having an angle of view wider than or equal to 180 degrees are included in the camera 41, the pair of fisheye lenses may capture an omni-directional image. At this time, the camera 41 may transfer two images captured using the pair of fisheye lenses to the transcoder 42. In another example, when it is assumed that the number of cameras 41 is plural, the plurality of cameras 41 may capture a space in different directions. In this case, the plurality of cameras 41 may generate a plurality of images captured in different directions in the form of separate two-dimensional images or one two-dimensional image and transfer the same to the transcoder 42.

Although it has been described that the image processed by the image processing system 40' is the image captured by the camera 41 in the aforementioned examples, it is not limited thereto. That is, the image to be processed by the image processing system 40' may be a virtual image (for example, a game image or an animation image viewed from a viewpoint of a virtual camera on the basis of a virtual space). Further, although it has been described that the image processed by the image processing system 40' is the omni-directional image, the image may be an image obtained by capturing a space in one direction or a plurality of directions. For example, the image processing system 40' may process an image captured using one of a pair of fisheye lenses.

The transcoder 42 maps the omni-direction image to the two-dimensional image. For example, the transcoder 42 may map two images captured through the fisheye lens to a three-dimensional image and map the three-dimensional image to a two-dimensional image. In this case, in order to map the omni-directional image to the three-dimensional image, the transcoder 42 may map the omni-directional image to an outer surface or an inner surface of a virtual three-dimensional model.

The transcoder 42 may directly map the omni-directional image to the two-dimensional image. For example, after obtaining transformation matrix A for mapping an omni-directional image to a three-dimensional image and transformation matrix B for mapping a three-dimensional image to a two-dimensional image, the transcoder 42 may acquire transformation matrix C on the basis of transformation matrix A and transformation matrix B, store the transformation matrixes in the form of metadata, and then use the transformation matrixes for calculations of converting the omni-directional image to a two-dimensional image. Transformation matrix A may be acquired on the basis of camera calibration parameters and transformation matrix B is a predetermined matrix for converting a three-dimensional image to a two-dimensional image and may be determined according to the type of the three-dimensional image and the type of the two-dimensional image.

The transcoder 42 may additionally generate a padding area and insert the padding area into the two-dimensional image.

Meanwhile, the transcoder 42 may simultaneously map the three-dimensional image to the two-dimensional image and generate metadata on a coordinate relation between the mapped three-dimensional image and the mapped two-dimensional image. Meanwhile, the transcoder 42 may transfer at least one of the mapped two-dimensional image and the metadata to the encoder.

The encoder 43 encodes the two-dimensional image received from the transcoder 42. For example, the encoder 43 may perform the encoding on the basis of the codec standard of H.264, MPEG-4, or HEVC.

The encoder 43 may store encoded image data of the two-dimensional image in the memory in the form of a video or a still image. Further, the encoder 43 may transfer the encoded image data to another electronic device in the form of streaming or a file. The stored or transferred encoded image data may be transmitted to the decoder.

Meanwhile, the metadata may be stored in the memory together with the encoded image data or transmitted in the form of streaming or a file. According to various embodiments, the metadata may be generated in the form of a separate document (for example, an Omni-directional Media Application Format (OMAF)) and stored while being associated with the encoded image data or transmitted while being associated therewith when there is a request for the image data. For example, the metadata may be automatically called together with the encoded image data while being associated with the encoded image data. The metadata may be transmitted together with or separately from the encoded image data when there is a request for the encoded image data or may be transmitted to a particular device or module separately from the request for the image data.

Meanwhile, the reception end includes the decoder 44, the renderer 45, and the display 46. Hereinafter, a detailed description of the part that overlaps the part of the transmission end described above will be omitted.

The decoder 44 receives image data encoded by the encoder 43 and decodes the image data. The decoder 44 may perform the decoding using the codec standard (for example, H.264, MPEG-4, HEVC, and the like) which is the same as the codec standard used when the encoder 43 encodes the mapped two-dimensional image.

The renderer 45 performs rendering on the basis of the decoded two-dimensional image (hereinafter, referred to as an input frame). In this case, the renderer 45 may additionally use metadata for the rendering. The metadata may be generated at the transmission end, transmitted to the reception end, and pre-stored in a storage unit of the reception end. For example, the metadata may be included in an exif field of JPEG when the metadata is encoded in the format of JPEG at the transmission end and may be included in a moov field of MPEG-4 when the metadata is compressed in the format of MPEG-4 at the transmission end. Further, the metadata may be included in the end part of the image frame. Meanwhile, the metadata may be provided in the form of an XML document such as X3D.

The renderer 45 may determine a padding area included in a plurality of image areas included in a two-dimensional image on the basis of padding information included in the metadata and render a boundary between one of the plurality of image areas and another area concatenated therewith on the basis of the determined padding area.

The display 46 may display the rendered output frame. To this end, the display 46 may be implemented as one or more of a liquid-crystal display (LCD), an organic light-emitting diode display (OLED), a flexible display, aerial imaging display, a hologram, an HMD, a Head-Up Display (HUD), and a 3D display.

In the above description, the image processing system 40 is divided into the camera 41, the transcoder 42, the encoder 43, the decoder 44, the renderer 45, and the display 46 for convenience of description. This is merely an example, and the image processing system 40 may be implemented by only some of the elements or implemented by a combination of some or all of the aforementioned elements and other elements. Further, although it has been described that the transcoder 42, the encoder 43, the decoder 44, and the renderer 45 among the aforementioned elements are implemented in physical hardware, they may be provided as software performing the aforementioned functions and stored in the memory 230 and may be loaded by a processor such as a Central Processing Unit (CPU) or a Graphic Processing Unit (GPU) and thus functions thereof may be executed.

Figure 6:
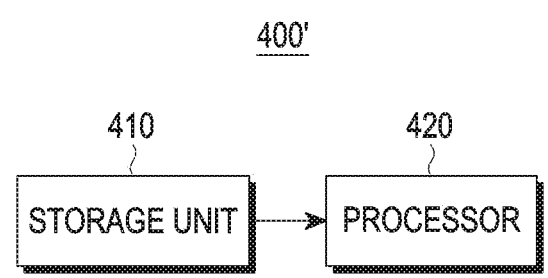
FIG. 6 is a block diagram illustrating an image processing device according to various embodiments of the disclosure.

FIG. 6 is a block diagram illustrating an image processing device according to various embodiments of the disclosure.

Referring to FIG. 6, an image processing device 400' includes a storage unit 410 and a processor 420.

The storage unit 410 may store an input frame and metadata.

According to an embodiment, the input frame may be a two-dimensional image to which an omni-directional image is mapped (hereinafter, referred to as a "two-dimensional image"). According to another embodiment, the storage unit 410 may store the omni-direction image, for example, a fisheye image (at least one image captured through a fisheye camera), and the processor 420 described below may map the fisheye image to a two-dimensional image and store the mapped two-dimensional image in the storage unit 410.

The processor 420 controls the image processing device 400' overall. Particularly, the processor 420 may generate an output frame. The processor 420 may map the omni-directional image included in the input frame to the output frame. That is, the processor 420 may load the input frame and metadata from the storage unit 410 and generate an output frame including at least one of a plurality of image areas to which an image of each face of a polyhedron is mapped on the basis of the loaded input frame and metadata.

According to an embodiment, when it is assumed that the image of each face of the polyhedron is mapped to the plurality of image areas included in the two-dimensional image after the omni-directional image is mapped to the polyhedron, the metadata may include type information of the polyhedron and array attribute information of the plurality of image areas included in the two-dimensional image.

For example, the type information of the polyhedron may be defined as "01" in the case of a regular octahedron and as "11" in the case of a regular icosahedron.

The array attribute information may indicate a mapping relation between each face of the polyhedron and each of the plurality of image areas.

According to an embodiment, it is assumed that, when the three-dimensional polyhedron is a regular octahedron, faces 1 to 8 of the regular octahedron numbered by positive integers are mapped to a plurality of image areas a to h included in the two-dimensional image frame. In this case, the array attribute information may indicate relation between each face of the three-dimensional polyhedron and each of the plurality of image areas included in the two-dimensional image frame.

The array attributes may vary. This is because the polyhedron type varies such as a regular octahedron and a regular icosahedrons and each face of the polyhedron may be mapped to the two-dimensional frame in various ways.

For example, an array method of a plurality of image areas in FIG. 8B described below is different from an array method of a plurality of image areas in FIG. 8C. In this case, the array method of the plurality of image areas in FIG. 8B may be defined as array attributes "001" and array attributes of the plurality of image areas in FIG. 8C may be defined as array attributes "011". "001" and "011: may be stored in metadata as sub type information.

The array attribute information may further include coordinate information. That is, the array attribute information may include mesh information between coordinate systems. According to an embodiment, the array attribute information may include matching information of spatial coordinates of each vertex of one face of the polyhedron and plane coordinates of an image area of the two-dimensional image to which one face of the polyhedron is mapped.

In the aforementioned example, it has been described that the processor 420 uses the metadata stored in the storage unit 410, but it is not limited thereto. According to an embodiment, the processor 420 may receive the metadata from an external device. According to another embodiment, the processor 420 may generate the metadata on the basis of a coordinate value of the two-dimensional image to which the omni-directional image is mapped. For example, the processor 420 may map the omni-directional image to each face of the regular octahedron and map each face of the octahedron to which the omni-directional image is mapped to the two-dimensional image. At this time, the processor 420 may match vertex coordinates of each face of the octahedron and vertex coordinates of the mapped two-dimensional image and generate metadata on the basis of the information. It is assumed that the omni-directional image is mapped to the regular octahedron, but a target to which the omni-directional image is mapped is not limited to the regular octahedron.

For example, the processor 420 may map the omni-directional image to an octahedron and then map each face of the mapped octahedron to a two-dimensional image. In this case, each face of the octahedron can be an isosceles triangle or a triangle having no pair of equal sides.

In another example, the processor 4120 may map the omni-directional image to each face of a hexahedron and map some of areas included in the faces of the mapped hexahedron to a two-dimensional image.

In the aforementioned examples, the processor 420 may match each vertex of the octahedron or the hexahedron and each vertex of the two-dimensional image and generate metadata on the basis of the information.

The processor 420 may map the omni-directional image included in the input frame to the two-dimensional image using the metadata. Hereinafter, an embodiment of a method of mapping the omni-directional image to the two-dimensional image will be described in detail with reference to FIGS. 7A to 7C.

Various methods of mapping an image obtained by capturing a three-dimensional space to a two-dimensional image have been already known. Among then, an ERP is representative. The ERP corresponds to equidistant cylindrical projection for converting spherical coordinates into Cartesian coordinates. However, when a three-dimensional sphere surface is mapped to a two-dimensional plane through the ERP, larger distortion may occur as the image is closer to both poles (North pole and South pole) on the two-dimensional plane. Accordingly, the ERP has a limitation on accurately expressing an original three-dimensional image.

According to various embodiments of the disclosure, the processor 420 may map an image captured in an omni direction (hereinafter, referred to as an "omni-directional image) to a polyhedron and map the image mapped to each face of the polyhedron to a two-dimensional image. According to various embodiments, the processor 420 may map the omni-direction image to a surface of a first three-dimensional object and map the image mapped to the surface of the first three-dimensional object to a surface of a second three-dimensional object. Thereafter, the processor 420 may map the image mapped to the surface of the second three-dimensional object to a two-dimensional plane.

For example, the processor 420 may map the image captured in the omni direction to a three-dimensional sphere having a predetermined radius (for example, camera focal length or depth information) and map the three-dimensional sphere to each face of a regular octahedron. Thereafter, the processor 420 may map each face of the regular octahedron to the two-dimensional image. The method includes, for example, an Octahedron Projection (OHP) method.

In the aforementioned example, the process of mapping the image captured in the omni direction to the sphere and then mapping the sphere to the two-dimensional image has been described, but it is not limited thereto. For example, the two-dimensional image may be generated by directly applying the OHP method to a fisheye image, an ERP image, a CPP image, or an image mapped to various types of polyhedrons (for example, a tetrahedron, a dodecahedron, or an icosahedron). Further, the image mapped to the sphere or the two-dimensional image does not necessarily need to be an image captured through a camera. For example, a virtual image may be mapped to the sphere or the two-dimensional image.

The OHP method according to various embodiments of the disclosure is a method of mapping a three-dimensional spherical surface to a two-dimensional plane using an octahedron platonic solid. Hereinafter, various embodiments of mapping using an octahedron will be described, but the disclosure is not limited thereto. According to an embodiment, a three-dimensional spherical surface may be mapped to a two-dimensional plane using a regular tetrahedron, a regular hexahedron, a regular dodecahedron, and a regular icosahedron. According to another embodiment, of course, a three-dimensional spherical surface can be mapped to a two-dimensional plane using a polyhedron having a plurality of different face shapes.

Figure 7A:
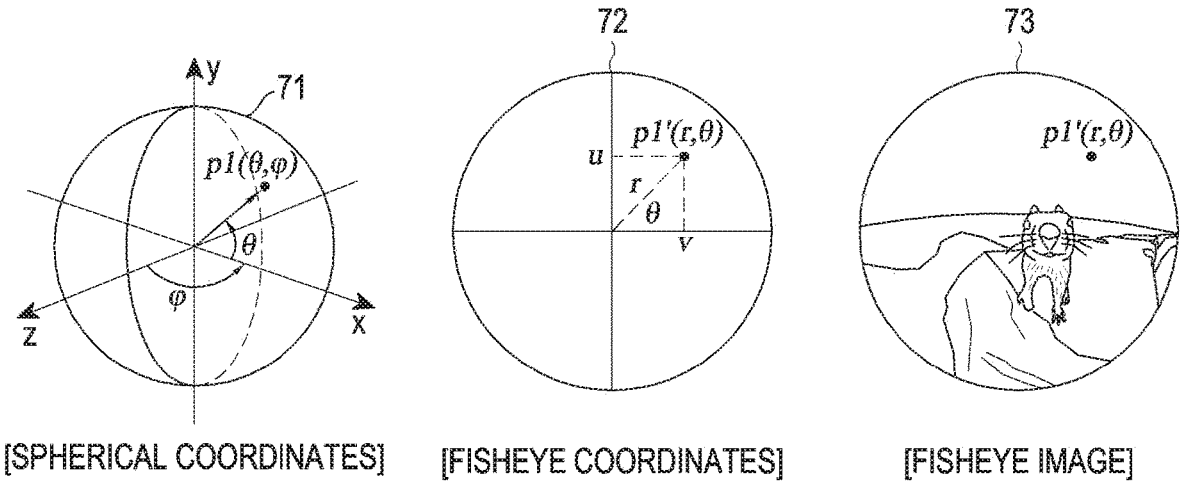
FIG. 7A illustrates an OHP method according to various embodiments of the disclosure.
Figure 7B:
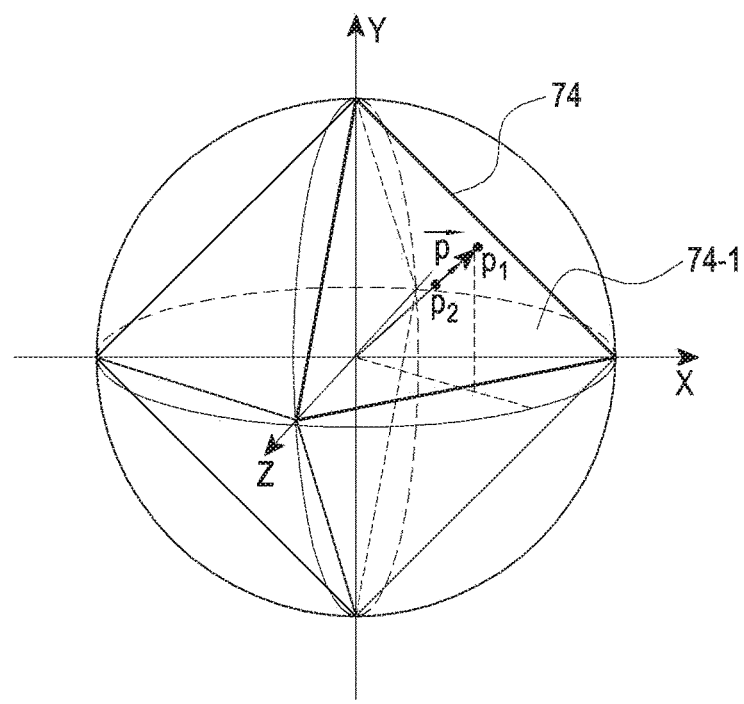
FIG. 7B illustrates an OHP method according to various embodiments of the disclosure.
Figure 7C:
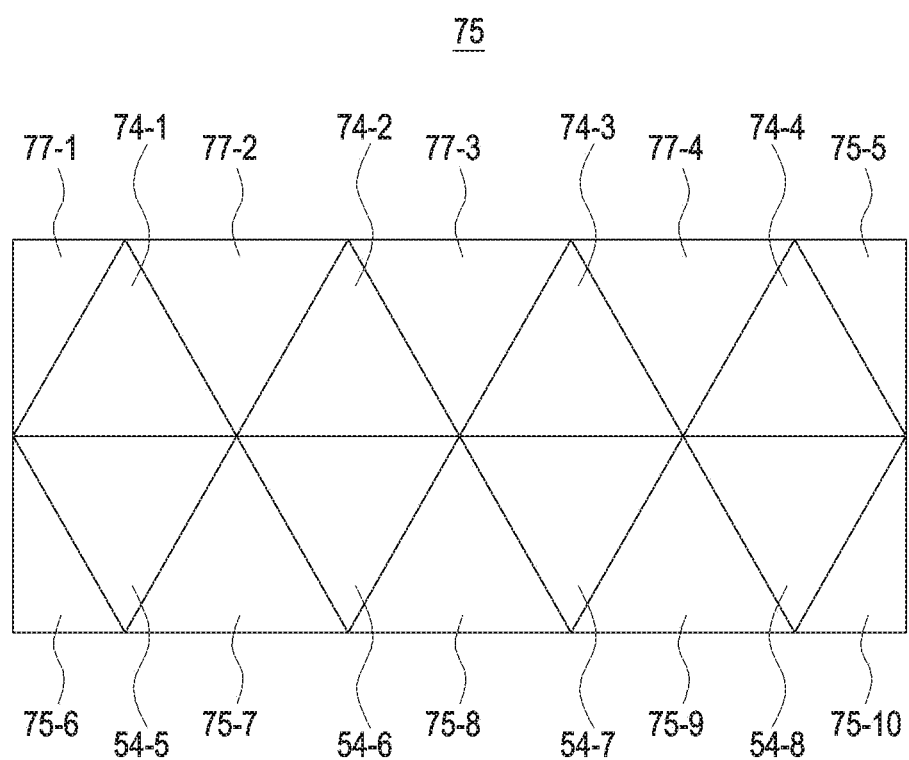
FIG. 7C illustrates an OHP method according to various embodiments of the disclosure.

FIG. 7A illustrates the OHP method according to various embodiments of the disclosure. FIG. 7B illustrates an OHP method according to various embodiments of the disclosure. FIG. 7C illustrates an OHP method according to various embodiments of the disclosure.

FIG. 7A illustrates a process of converting spherical coordinates 71 into coordinates (hereinafter, referred to as a "fisheye image") 72 of an image 73 captured through a fisheye lens.

An example is described based on the assumption that a point of fisheye coordinates 72 of the fisheye image 73 corresponding to a point $p1(\Phi, \theta)$ of the spherical coordinates is $p1'(r, \theta)$. The relationship between $\Phi$, $\theta$ of the spherical coordinates 71 and r, u, v of the fisheye coordinates 72 is as shown in [Equation 1] below.

$$r=\varphi/(\pi/2),\ u=\frac{1}{2}(1+\cos\theta),\ v=\frac{1}{2}(1+\sin\theta)\qquad\text{Equation 1}$$

In [Equation 1] above, the point p1'(r, θ) of the fisheye image 73 corresponds to the point p1(Φ, θ) of the spherical coordinates 71. Not only the point p1'(r, θ) but also all points included in the fisheye image 72 may correspond to the spherical coordinates 71. In this case, the aforementioned point may be, for example, a pixel. Accordingly, pixel values of all pixels included in the fisheye image 73 may match the spherical coordinates 71.

Subsequently, the processor 420 may convert points of the spherical coordinates 71 into coordinates included in faces of a regular octahedron.

FIG. 7B illustrates an example of a method of corresponding a point p1 of the spherical coordinates 71 to a point p2 included in a face 74-1 of a regular octahedron. 74

For example, it is assumed that a vector from the center of the spherical coordinates 71 to the point p1 is a vector $\vec{p}$.

On the vector $\vec{p}$, the point p1 and the point p2 exist. That is, the point p2 is an intersection point between the vector $\vec{p}$ and the face of the regular octahedron.

As a result, a point p1' of the fisheye image 73 matches the point p2 on the face 74-1 of the regular octahedron 74. For example, a pixel value of a pixel corresponding to the point p1' of the fisheye image may be set as a pixel value of a pixel corresponding to the point p2 on the face 74-1 of the regular octahedron 74.

Subsequently, the faces of the regular octahedron 74 may match a two-dimensional plane 75.

For example, as illustrated in FIG. 7C, the respective faces of the regular octahedron 74 may map to a first area 74-1 to 74-8 of the two-dimensional image 75. A second area 75-1 to 75-10 is an area to which no face of the regular octahedron 74 is mapped.

The second area 75-1 to 75-10 corresponds to a "no data" area to which no face of the regular octahedron 74 is mapped and includes no image data. Accordingly, the two-dimensional image 75 to which the fisheye image 73 from which lens distortion is corrected is mapped has actual image data capacity which is significantly smaller than that of the two-dimensional image obtained by mapping the fisheye image 73 to a three-dimensional sphere according to the OHP method and then mapping the spherical image according to the ERP method. Therefore, when the two-dimensional image 75 to which the fisheye image 73 is mapped is encoded according to the OHP, it is possible to obtain larger compression efficiency compared to the case using the ERP.

Meanwhile, there are various methods of mapping the faces of the regular octahedron 74 to which the spherical coordinates 71 are mapped to the two-dimensional image. Such examples will be described with reference to FIGS. 8A to 8G. The method of mapping the regular octahedron 74 to the two-dimensional image is not limited to the following methods.

Figure 8A:
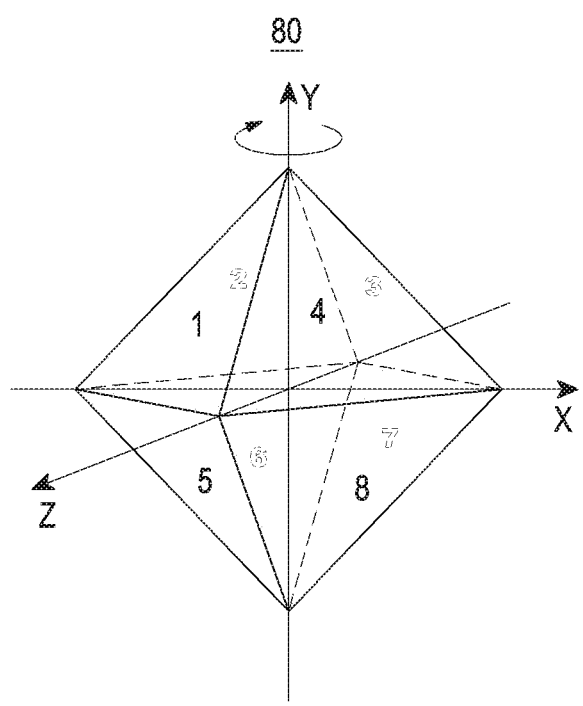
FIG. 8 illustrates the OHP method according to various embodiments of the disclosure.
FIG. 8B illustrates the OHP method according to various embodiments of the disclosure.
FIG. 8C illustrates the OHP method according to various embodiments of the disclosure.
FIG. 8D illustrates the OHP method according to various embodiments of the disclosure.
FIG. 8E illustrates the OHP method according to various embodiments of the disclosure.
FIG. 8F illustrates the OHP method according to various embodiments of the disclosure.
FIG. 8G illustrates the OHP method according to various embodiments of the disclosure.

FIG. 8A illustrates the OHP method according to various embodiments of the disclosure. FIG. 8B illustrates the OHP method according to various embodiments of the disclosure. FIG. 8C illustrates the OHP method according to various embodiments of the disclosure. FIG. 8D illustrates the OHP method according to various embodiments of the disclosure. FIG. 8E illustrates the OHP method according to various embodiments of the disclosure. FIG. 8F illustrates the OHP method according to various embodiments of the disclosure.

Figure 8B:
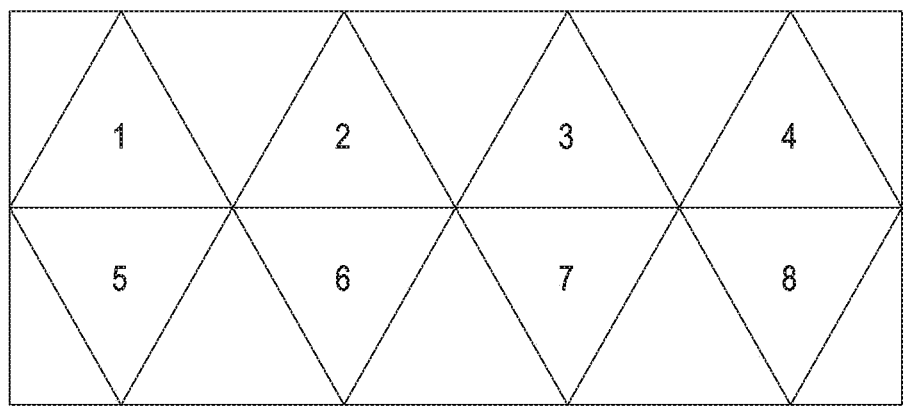
Figure 8C:
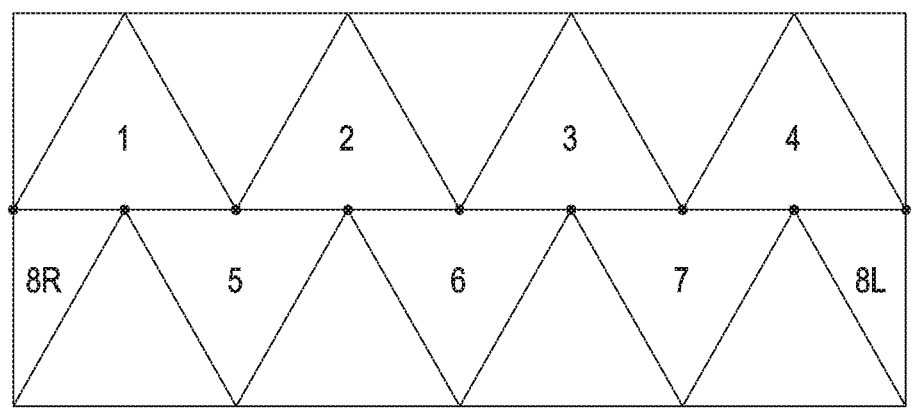
Figure 8D:
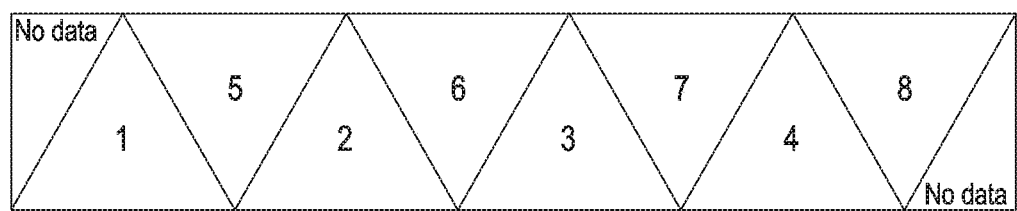
Figure 8E:
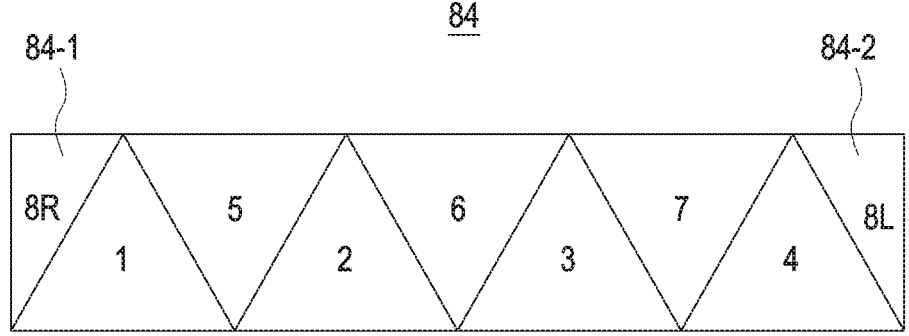
Figure 8F:
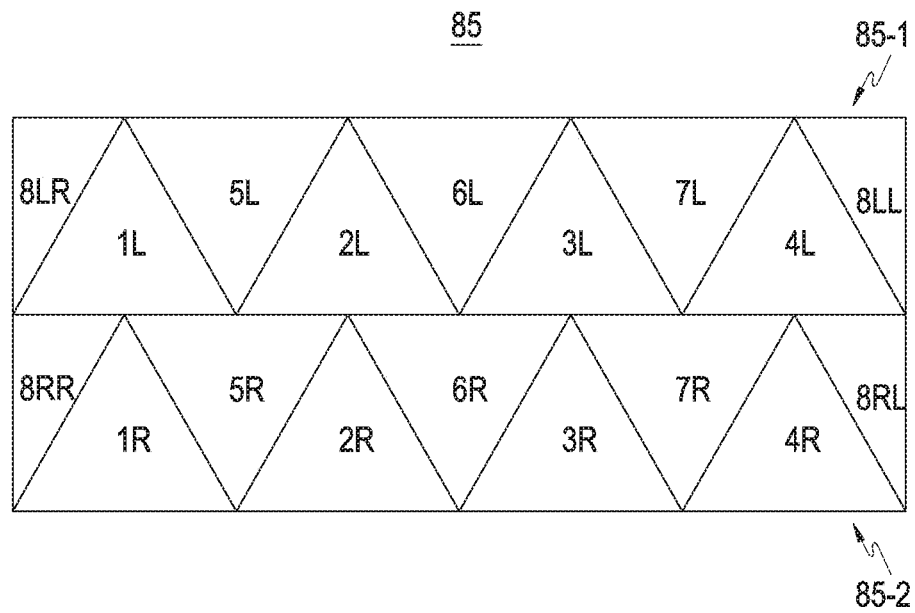
Figure 8G:
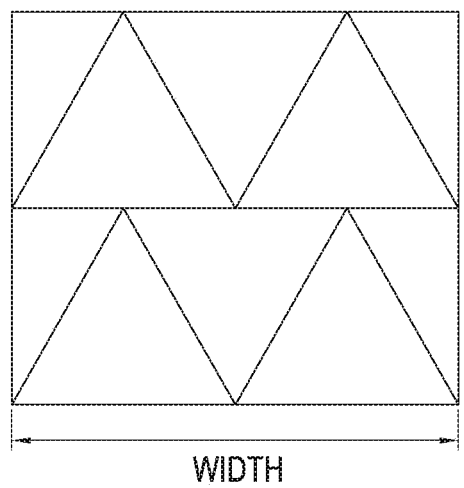

FIG. 8G illustrates the OHP method according to various embodiments of the disclosure.

Referring to FIG. 8A, a regular octahedron 80 includes 8 faces numbered from 1 to 8. Face 1 to face 4 of the regular octahedron 80 are defined as upper faces and face 5 to face 8 are defined as lower faces. In this case, the number of upper faces and the number of lower faces are the same as each other, which is ½ of all faces. Further, each side of triangles on the plane having X and Z axes has bearing of 360/(N/2)(N is the number of faces of a polyhedron) based on a Y axis of the polyhedron. For example, each face of the regular octahedron 80 split the omni direction, that is, 360 degrees surrounding the y axis by 90 degrees based on the Y axis in the upper part and the lower part. In another example, in the case of a hexadecahedron having 8 upper faces and 8 lower faces, each face of which is an isosceles triangle, each face of the hexadecahedron splits the omni direction, that is, 360 degrees surrounding the Y axis by 45 degrees based on the Y axis. Hereinafter, a method of arranging the respective faces (face 1 to face 8) of the regular octahedron 80 of FIG. 8A in a two-dimensional image will be described with reference to FIGS. 8B to 8H.

Referring to FIG. 8B, upper faces of the regular octahedron 80, that is, face 1 to face 4 are arranged from the left to the right on the upper part of the two-dimensional image 81 in a clockwise direction. Further, lower faces of the regular octahedron 80, that is, face 5 to face 8 are arranged from the left to the right on the lower part of the two-dimensional image 61 in a clockwise direction.

Referring to FIG. 8C, the upper faces of the regular octahedron 80, that is face 1 to face 4 are arranged from the left to the right on the upper part of the two-dimensional image 82. In a state where lower faces of the regular octahedron 80 rotate by 45 degrees in a counterclockwise direction from the Y axis of the regular octahedron 80, face 5 to face 8 of the lower faces are arranged from the left to the right on the lower part of the two-dimensional image 82 in a clockwise direction. In FIG. 8C, face 8L is a left face of face 8 and face 8R is a right face of side 8.

Meanwhile, the faces of the regular octahedron 80 may be arranged according to an array method of minimizing an area ("no data" area) to which no image is mapped in the two-dimensional image 82. In this case, since the size of the two-dimensional image can be reduced by removing the "no data" area, encoding efficiency and image transmission efficiency can be increased. In other words, the "no data" area has no image mapped thereto but has a predetermined pixel value (for example, one or more of a black, a chroma-key color, and transparency), and capacity of data to be encoded or transmitted may be further reduced as the "no data" area is further minimized. According to an embodiment, as illustrated in FIG. 8D, the upper faces (face 1 to face 4) and the lower faces (face 5 to face 8) of the regular octahedron 80 may be alternately arranged on the two-dimensional image 83.

Referring to FIG. 8E, there may be a method of splitting face 8 of the regular octahedron 80 into face 8L (left) and face 8R (right) and mapping face 8L and face 8R to areas 84-1 and 84-2 of the two-dimensional image 84.

FIG. 8F illustrates a method of mapping a left eye image of the three-dimensional image to a two-dimensional image.

Referring to FIG. 8F, a left eye image is mapped to an upper part 85-1 of a two-dimensional image 85 and a right eye image is mapped to a lower part 85-2 of the two-dimensional image 85. Referring to FIG. 8F, with respect to face 1, face 1L is an image corresponding to a lefty eye and face 1R is an image corresponding to a right eye, and 8LL indicates a left half face of the rectangle corresponding to the left eye and 8RL indicates a right half face of the rectangle corresponding to the right eye. FIG. 8F is a stereoscopic image in which a left eye image and a right eye image are arranged in a top-down type, which is as metadata used for generating the two-dimensional image 85. In this case, the image illustrated in FIG. 8F may be identified by one or more identifiers indicating that arrangement of the left eye and the right eye is a top-down type.

According to various embodiments, it is possible to use a method of mapping upper faces of a left eye image and a right eye image of a stereoscopic shape corresponding to a shape of the regular octahedron 80 to the upper part of the two-dimensional image and mapping lower faces to the lower part of the two-dimensional image (not shown). That is, triangles of each of the left eye and right eye images corresponding to face 1 to face 4 of the regular octahedron 80 may be arranged on the upper part and triangles of each of the left eye and right eye images corresponding to face 5 to face 8 may be arranged on the lower part (hereinafter, referred to as a mixed type). This has an effect of making triangles including similar images close to each other, thereby improving encoding compression efficiency and transmission efficiency.

Meanwhile, a method of reducing, when a three-dimensional image is mapped to a two-dimensional image, a width (a horizontal resolution and the number of pixels on a row) of the two-dimensional image may be also considered. Since every electronic device has a limitation on a width of a two-dimensional image used for rendering, the two-dimensional image can be rendered in more various electronic devices as a two-dimensional image with a smaller width.

For example, referring to FIG. 8G, a two-dimensional image 86 includes the same amount of image data as the two-dimensional image of FIG. 8E, but the width of the two-dimensional image 86 is just half the two-dimensional image of FIG. 8E. A method of controlling the width of the mapped two-dimensional image can be equally applied to a method of mapping a stereoscopic image including left eye and right eye images to a two-dimensional image.

According to various embodiments, after each of the left eye image and the right eye image is generated in the form of the two-dimensional image 86 of FIG. 8E, one two-dimensional image on which the images are successively arranged from the left to the right may be generated. Metadata indicating such a structure may include indicators indicating whether the image is a stereoscopic image and indicating arrangements of the left eye and the right eye (for example, stereoscopic=true, stereoscopic_type=side-by-side or left-right). According to various embodiments, one two-dimensional image on which the left eye image and the right eye image are arranged in a top-down form may be generated.

The various embodiments for mapping the omni-directional image to the two-dimensional image using the polyhedron (for example, the regular octahedron) have been described above. As described above, the two-dimensional image to which the omni-directional image is mapped may be pre-stored in the storage unit 410 or the omni-directional image (for example, a fisheye image or an ERP image) may be mapped to the two-dimensional image and stored in the storage unit 410 by the processor 420.

Meanwhile, the metadata may further include padding information. The padding information may include at least one piece of size information of a padding area included in at least one of a plurality of image areas included in the two-dimensional image and resolution image of at least one of the plurality of image areas.

The processor 420 may generate a padding area included in at least one of the plurality of image areas on the basis of the padding information.

The padding area is used for rendering a boundary between a plurality of images included in the two-dimensional image during a rendering process described below. By performing the rendering using the padding area, it is possible to guarantee a quality of a boundary part between the plurality of areas included in the two-dimensional image. For example, when two adjacent faces of a polyhedron are rendered, a padding area may provide sufficient image information of the part of the two adjacent faces, thereby preventing distortion or noise generated in a boundary line or a boundary surface. Further, when one image is generated by stitching images of two faces using pixel information of each padding area associated with the adjacent part of two faces, a higher-quality image can be obtained.

Figure 9A:
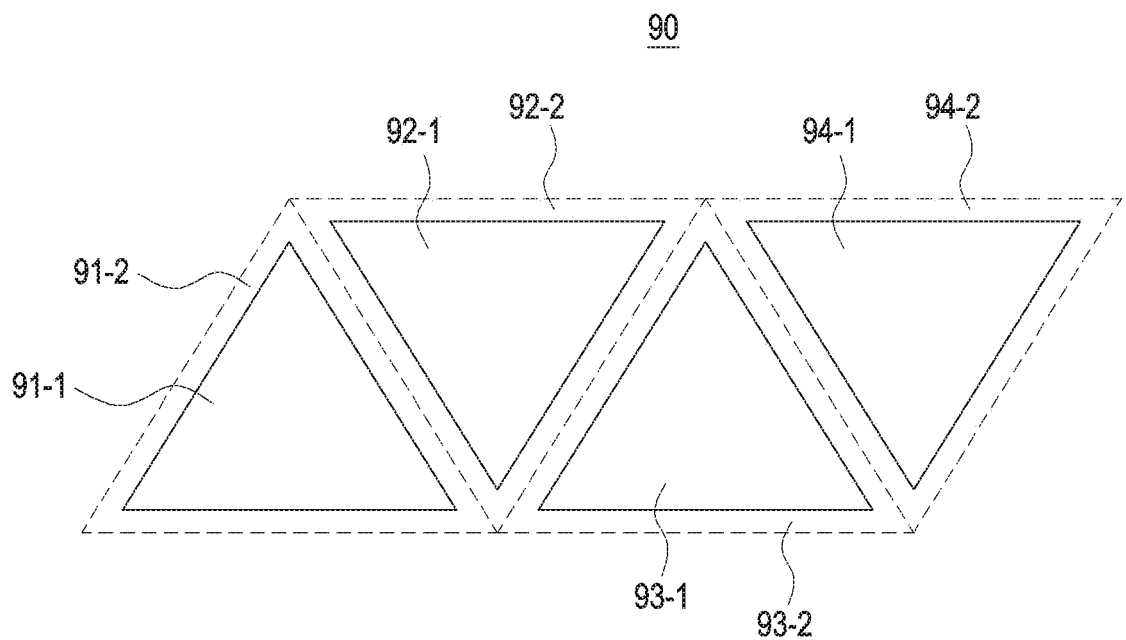
FIG. 9A illustrates a method of setting a padding area according to various embodiments of the disclosure.
Figure 9B:
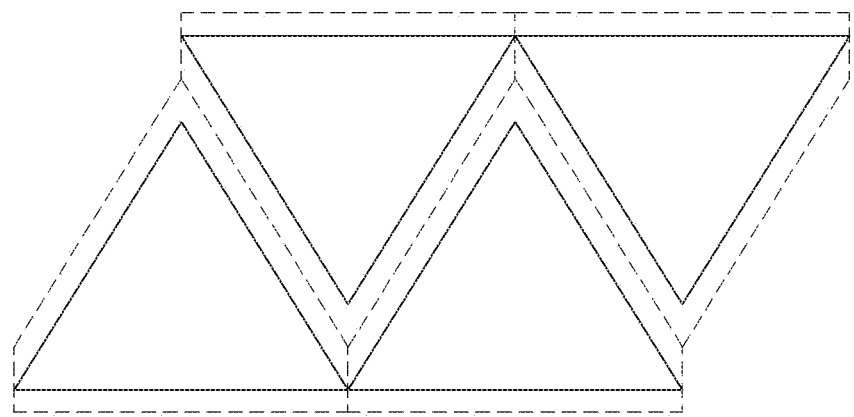
FIG. 9B illustrates a method of setting a padding area according to various embodiments of the disclosure.

The padding area may be set in various methods, and hereinafter FIG. 9A illustrates a method of setting a padding area according to various embodiments of the disclosure. FIG. 9B illustrates a method of setting a padding area according to various embodiments of the disclosure.

Referring to FIG. 9A, the processor 420 may set padding areas 91-2, 92-2, 93-2, and 94-2 over all boundary parts of respective areas 91-1, 92-1, 93-1, and 94-1 of a two-dimensional image 90.

FIG. 9B illustrates a method of setting a padding area having a narrower width than the two-dimensional image 95 of FIG. 9A. In the method of setting the padding area of FIG. 9A, if it is assumed that, for example, an ERP image is mapped to the two-dimensional image 95, a width of the ERP image and a width of the two-dimensional image 95 to which the ERP image to which the OHP method is applied is mapped are the same as each other.

When the padding area is set, the processor 420 may set a pixel value in the set padding area. There are various methods of setting the pixel value in the padding area, and hereinafter the method of setting the pixel value in the padding area according to various embodiments of the disclosure will be described with reference to FIGS. 10 and 11.

First, the pixel value of the padding area may be determined using a pixel value of a neighboring image area among a plurality of image areas included in the two-dimensional image.

Figure 10:
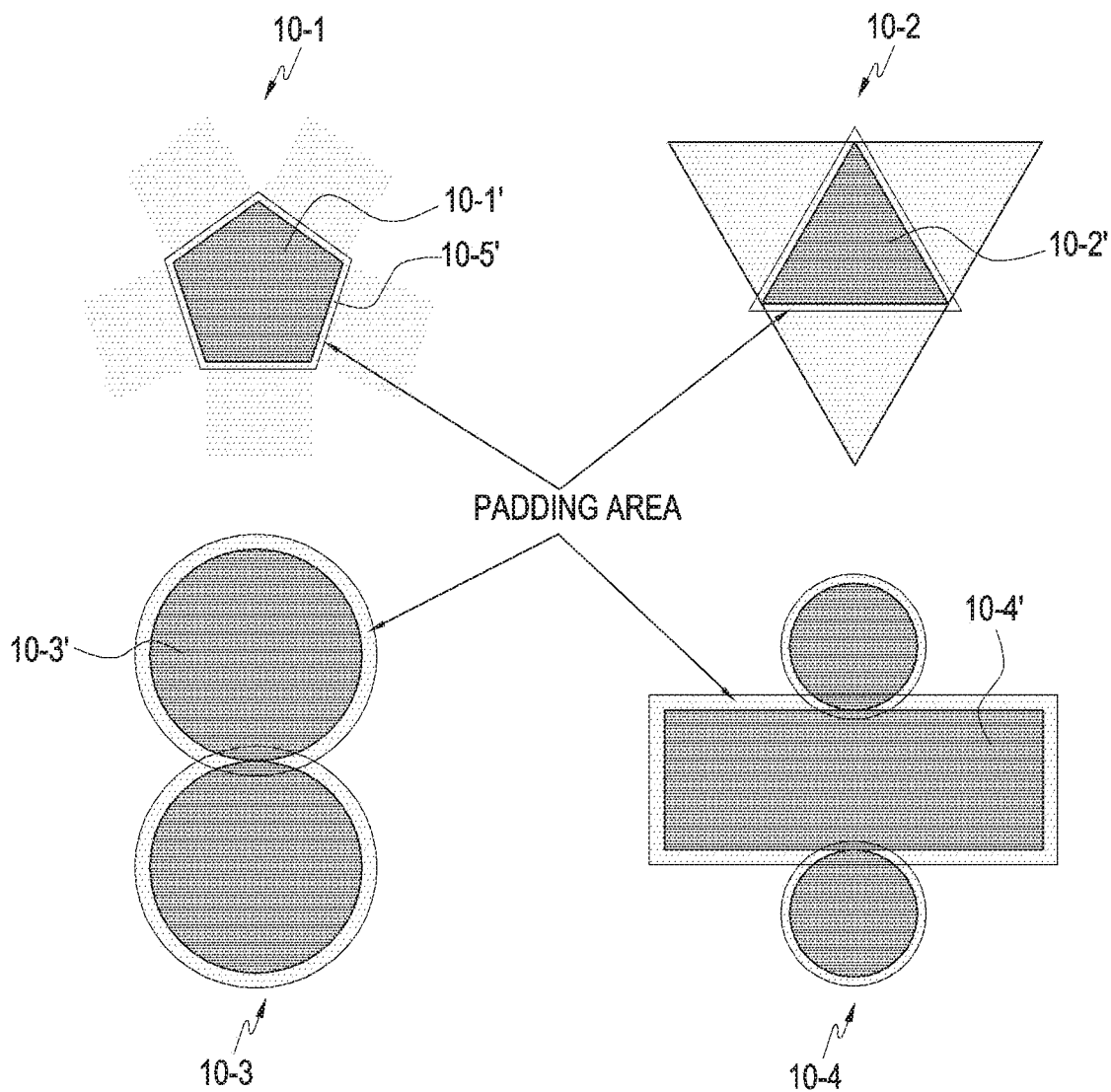
FIG. 10 illustrates a method of setting a pixel value of a padding area according to various embodiments of the disclosure.

For example, referring to FIG. 10, a method of using a pixel value of a neighboring image area may include a case 10-1 in which an image of each face of a regular dodecahedron is mapped to a two-dimensional image, a case 10-2 in which an image of each face of a regular octahedron is mapped to a two-dimensional image, a case 10-3 in which a fisheye image is mapped to a two-dimensional image, and a case 10-4 in which an image of each face of a cylinder is mapped to a two-dimensional image. The processor 120 may set a pixel value of an area adjacent to each of the image areas 10-1', 10-2', 10-3', and 10-4' as the pixel value of the padding area 10-5.

Figure 11:
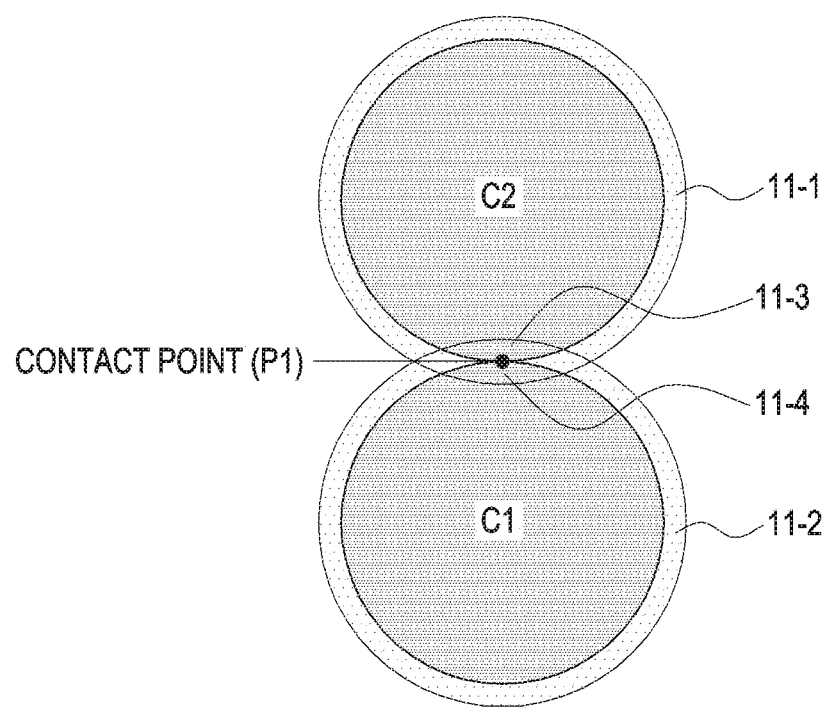
FIG. 11 illustrates a method of setting a pixel value of a padding area according to various embodiments of the disclosure.

For example, referring to FIG. 11, adjacent circular image areas C1 and C2 meet a contact point (P1). In this case, when C1 makes one resolution in the state in which C2 is fixed and C1 contacts C2, contact areas 11-1 and 11-2 of C1 and C2 are generated, and the processor 420 may set the corresponding areas 11-1 and 11-2 as padding areas. That is, the first padding area 11-1 may be set as a padding area of image area C1 and the second padding area 11-2 may be configured as a padding area of image C2. A pixel value of the first padding area 11-1 may be set as a pixel value of a first intersection area 11-4 of image areas C1 and C2 and a pixel value of the second padding area 11-2 may be set as a pixel value of a second intersection area 11-3 of image areas C1 and C2.

In the above example, the method using the pixel value of the image area adjacent to the image area corresponding to the padding area has been described in detail in order to determine the pixel value of the padding area. Hereinafter, as another embodiment of the method of determining the pixel value of the padding area, an embodiment of a method using a pixel value of a plane having the same normal vector as the image area on the space will be described in detail with reference to FIGS. 12A to 15B in order to determine the pixel value of the padding area corresponding to the image area on the space.

Figure 12A:
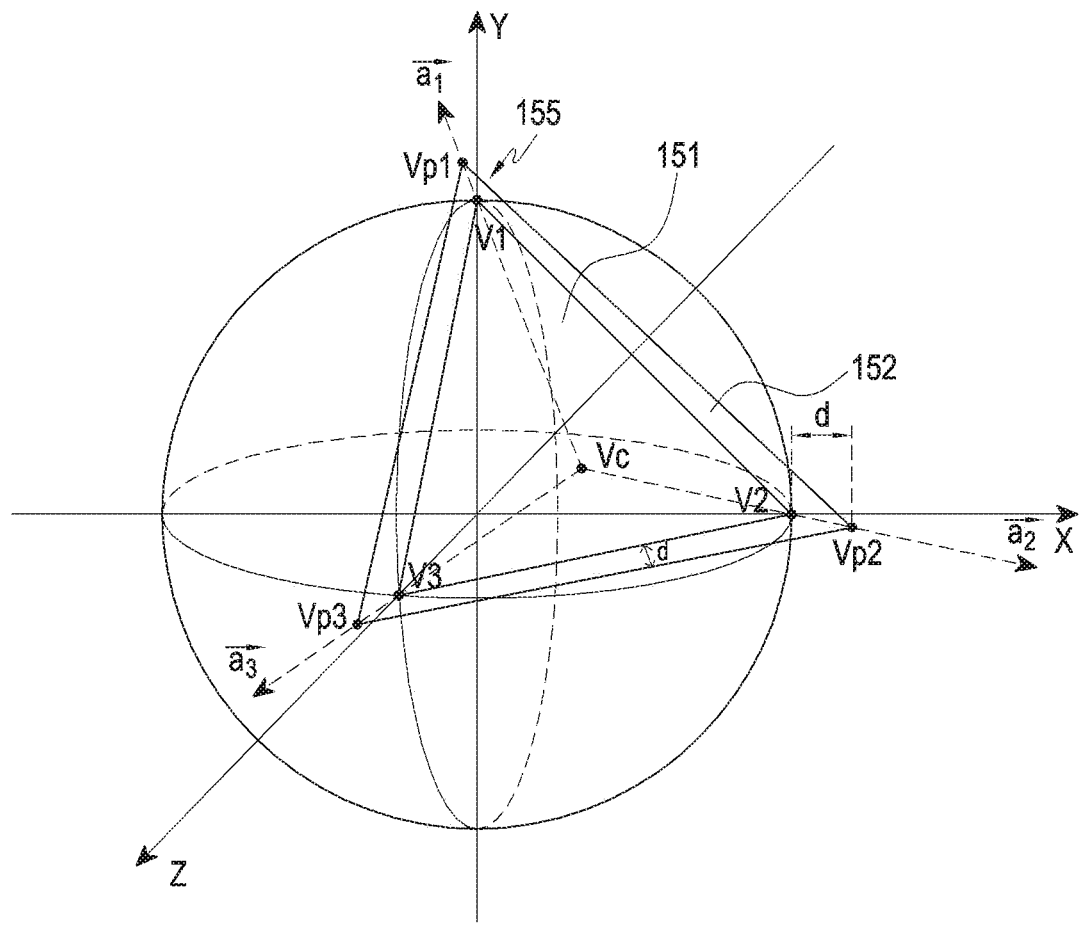
FIG. 12A illustrates a method of setting a padding area according to various embodiments of the disclosure.
Figure 12B:
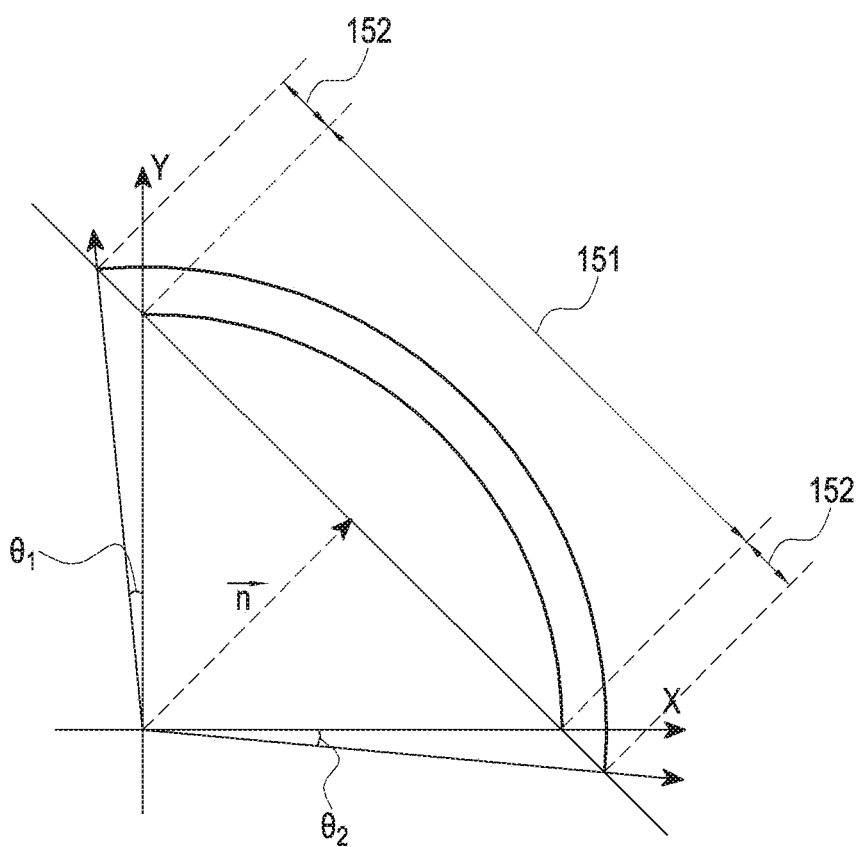
FIG. 12B illustrates a method of setting a padding area according to various embodiments of the disclosure.

FIG. 12A illustrates a method of setting a padding area according to various embodiments of the disclosure. FIG. 12B illustrates a method of setting a padding area according to various embodiments of the disclosure.

FIG. 12A illustrates a method of setting a pixel value of a padding area 152 for one face 151 of a regular octahedron. The padding area 152 has the same normal vector as the one face 151.

In the method of setting the padding area, a central point of the one face 151 of a rectangle is first determined. Specifically, a central point Vc is a point located at the same distance from vertexes V1, V2, and V3 of the one face 151 of the triangle. In this case, vectors $\vec{a1}$, $\vec{a2}$, $\vec{a3}$ toward the vertexes V1, V2, and V3 of the one face 151 from the central point Vc are defined. When it is assumed that the size of the padding area 152 is set as d (the size of the padding area will be described below in detail), new vectors $\vec{a1'}$ $\vec{a2'}$ $\vec{a3'}$ having the same direction as the vectors $\vec{a1}$, $\vec{a2}$, $\vec{a3}$ and has the size larger than the vectors $\vec{a1}$, $\vec{a2}$, $\vec{a3}$ by d are defined. As a result, the padding area is defined as an area 152 between a triangle 155 defined by end points of the new vectors $\vec{a1'}$ $\vec{a2'}$ $\vec{a3'}$ and the one face 151 of the triangle.

FIG. 12B illustrates FIG. 12A on an x-y plane to assist understanding. Referring to FIG. 12B, the padding area 152 is defined according to the aforementioned method. Further, the normal vectors for the one face 151 of the triangle and the padding area 152 are the same as each other which is $\vec{n}$.

When the padding area 152 is set, a pixel value may be set in the padding area 152. According to an embodiment, when the padding area expanded from the one face 151 of the triangle is viewed from the origin, a pixel value of corresponding spherical coordinates may be set as a pixel value of the padding area 152. That is, pixel values of the sphere corresponding to angles θ1 and θ2 may be mapped to the padding area 152.

According to another embodiment, the pixel value of the one face 151 of the triangle may be set as the pixel value of the padding area 152. According to another embodiment, a value obtained by interpolating the pixel value of the one face 151 of the triangle may be set as the pixel value of the padding area 152.

Figure 13A:
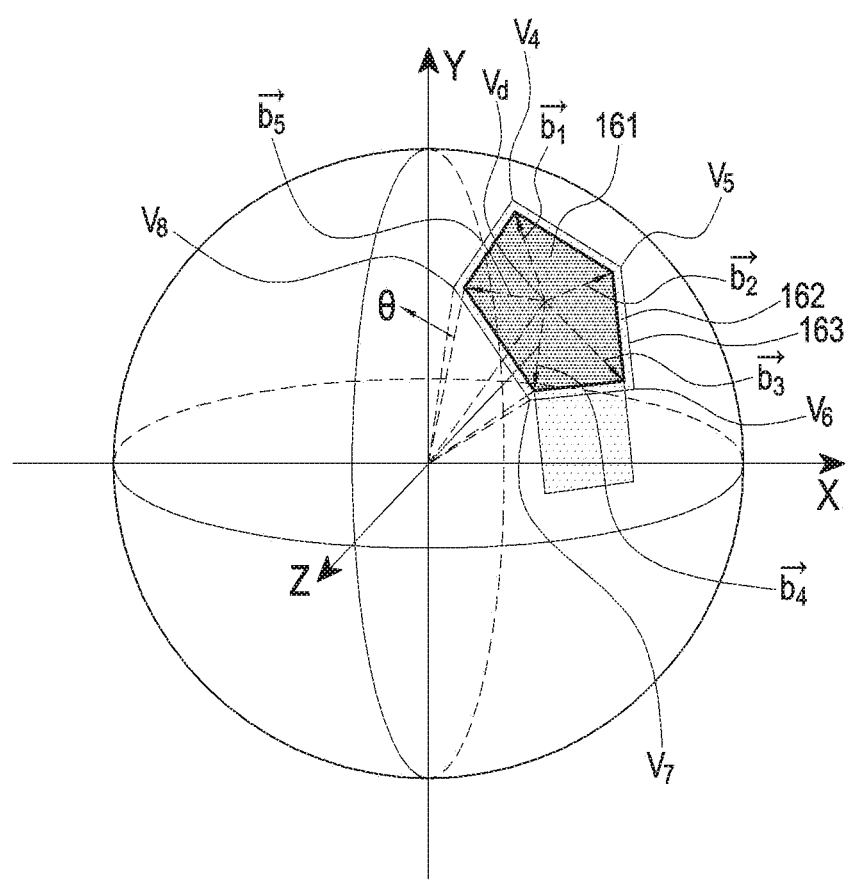
FIG. 13A illustrates a method of setting a padding area according to various embodiments of the disclosure.
Figure 13B:
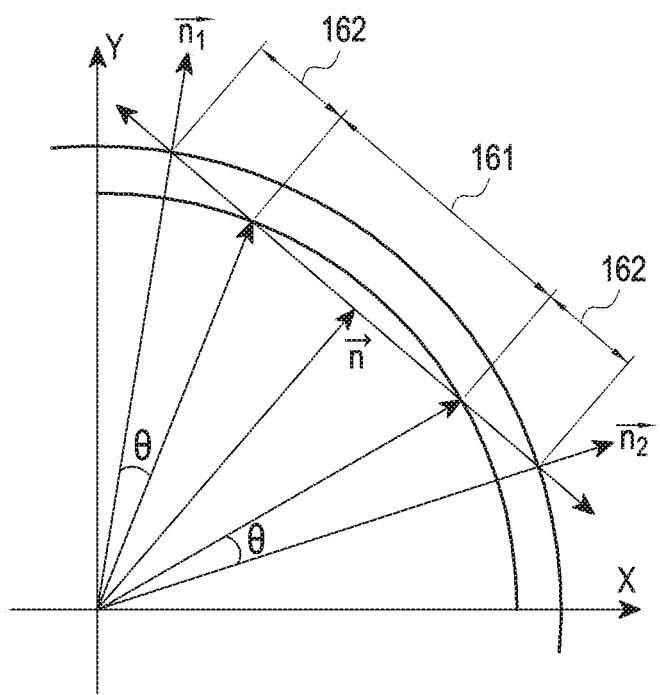
FIG. 13B illustrates a method of setting a padding area according to various embodiments of the disclosure.

FIG. 13A illustrates a method of setting a padding area according to various embodiments of the disclosure. FIG. 13B illustrates a method of setting a padding area according to various embodiments of the disclosure.

FIG. 13A illustrates a method of setting a pixel value of a padding area 162 for one face 161 of a regular dodecahedron. The padding area 162 has the same normal vector as the one face 161.

Referring to FIG. 13A, in the method of setting the padding area, a central point of the one face 161 is determined. A central point Vd is a point located at the same distance from vertexes V4, V5, V6, V7, and V8 of the one face 161 of a triangle. In this case, vectors $\vec{b1}$ to $\vec{b5}$ toward the vertexes V4, V5, V6, V7, and V8 of the one face 161 from the central point Vd are defined. When it is assumed that the size of the padding area 162 is set as d1, new vectors $\vec{b1}$ to $\vec{b5}$ having the same direction as the vectors $\vec{b1}$ to $\vec{b5}$ and having the size larger than the vectors $\vec{b1}$ to $\vec{b5}$ by d1 are defined. As a result, the padding area is defined as the area 162 between a pentagon 163 defined by end points of the new vectors $\vec{b1'}$ to $\vec{b5'}$ and the one face 151 of the octagon.

FIG. 13B illustrates FIG. 13A on an x-y plane to assist understanding.

Referring to FIG. 13B, the area 162 expanded to both sides by θ from the one face 161 of the existing pentagon is the padding area.

When the padding area 162 is set, a pixel value may be set in the padding area 162. According to an embodiment, when the padding area 162 expanded from the one face 161 of the pentagon is viewed from the origin, a pixel value of corresponding spherical coordinates may be set as a pixel value of the padding area 162. That is, the pixel value corresponding to the angle θ may be mapped to the padding area 162.

Figure 14A:
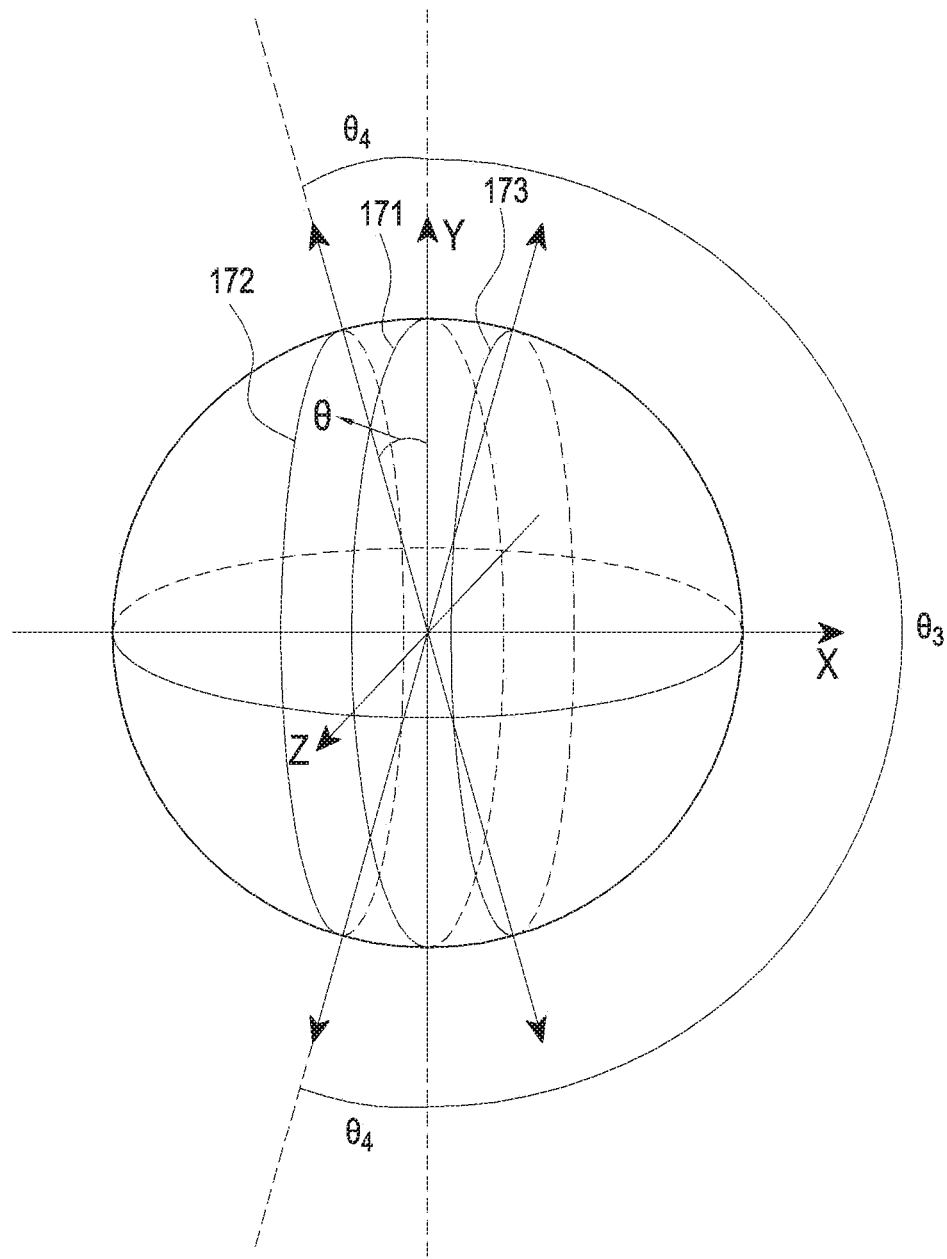
FIG. 14A illustrates a method of setting a padding area according to various embodiments of the disclosure.
Figure 14B:
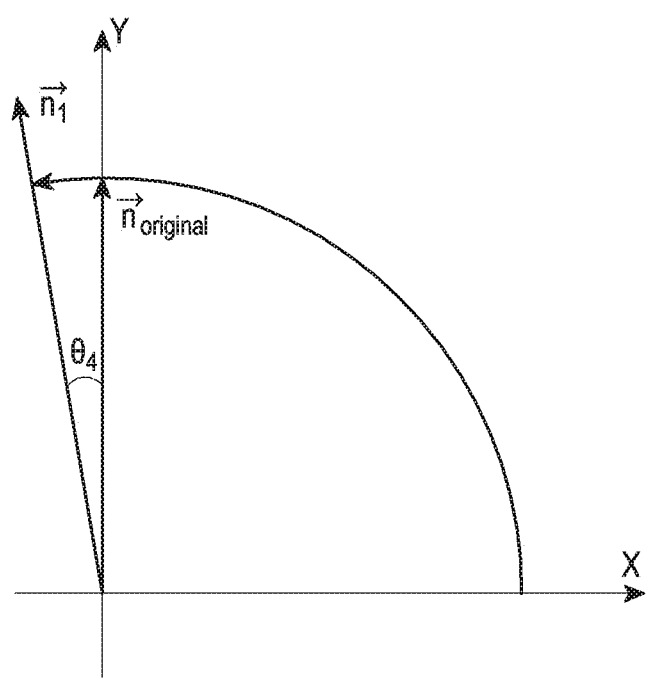
FIG. 14B illustrates a method of setting a padding area according to various embodiments of the disclosure.

FIG. 14A illustrates a method of setting a padding area according to various embodiments of the disclosure. FIG. 14B illustrates a method of setting a padding area according to various embodiments of the disclosure.

FIG. 14A illustrates a method of setting a padding area of a fisheye image 171. According to an embodiment, it is assumed that the fisheye image 171 is an image captured through a left eye camera. Further, it is assumed that the left eye camera captures an area of an angle θ3. In this case, when it is assumed that the size of the padding area is an angle θ4, a new left eye image 172 including the padding area may include an image of an area of an angle 'θ3+2θ4'. A new right eye image 173 may be also generated in the same way as the new left eye image 172.

FIG. 14B illustrates FIG. 14A on an x-y plane to assist understanding.

Referring to FIG. 14B, an angle θ4 between vectors and $\vec{n1}$ and $\vec{n_{original}}$ is the size of the padding area. According to an embodiment, a pixel value of the padding area included in the new left eye image 172 may be a pixel value of a spherical area corresponding to the angle θ4.

Figure 15A:
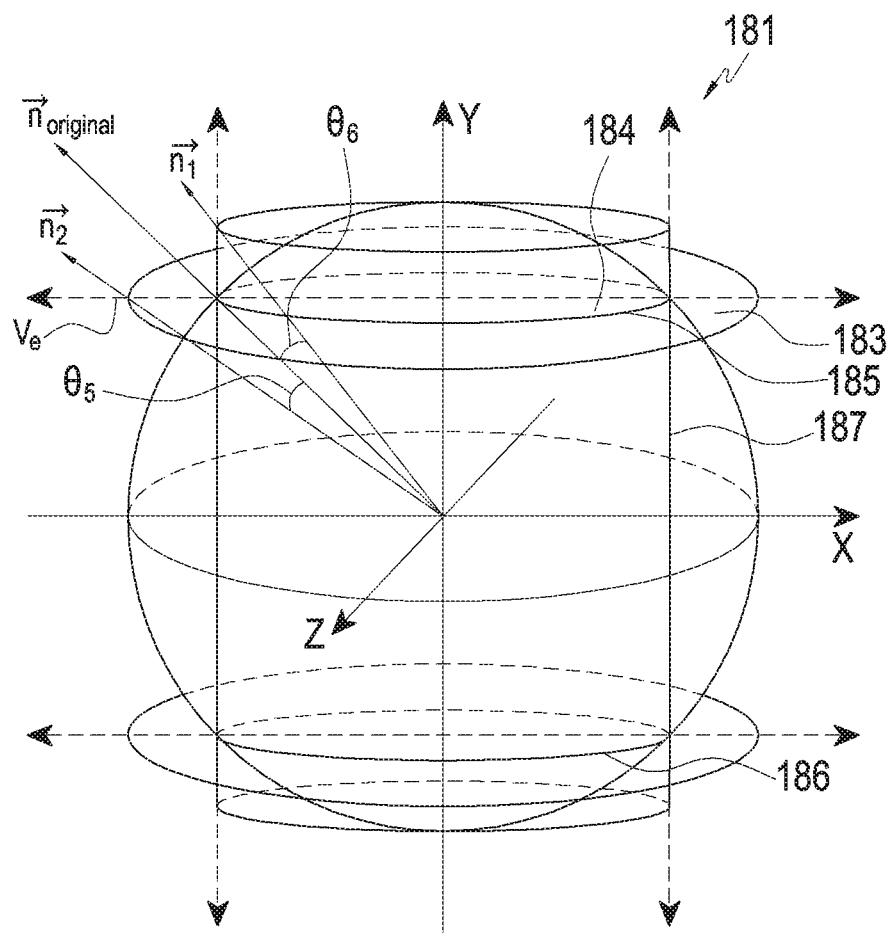
FIG. 15A illustrate a method of setting a padding area according to various embodiments of the disclosure.
Figure 15B:
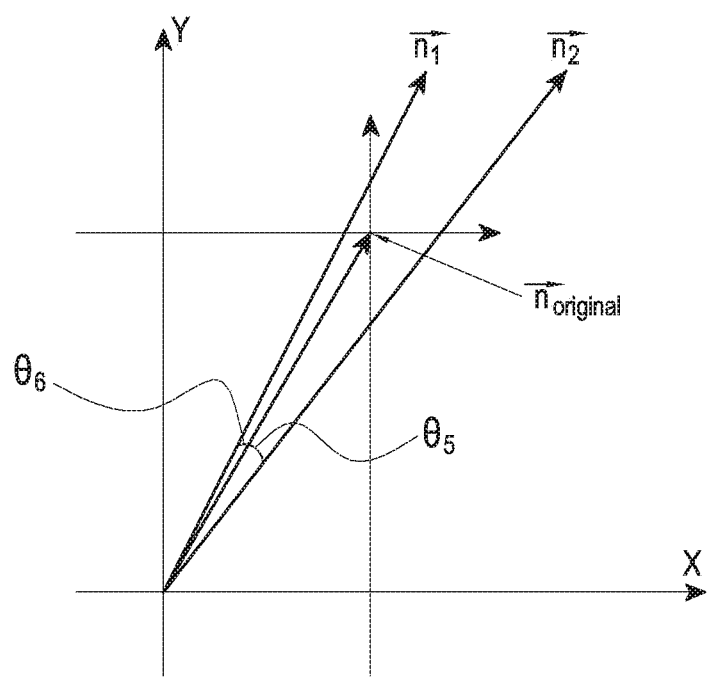
FIG. 15B illustrates a method of setting a padding area according to various embodiments of the disclosure.

FIG. 15A illustrates a method of setting a padding area according to various embodiments of the disclosure. FIG. 15B illustrates a method of setting a padding area according to various embodiments of the disclosure.

FIG. 15A illustrates a method of setting a padding area in the case of cylindrical projection. A cylinder 181 may be divided into an upper surface 185, a lower surface 186, and a side surface 187.

According to an embodiment, in the case of the upper surface 185 of the cylinder 181, when it is assumed that the size of the padding area 183 is θ5, an area between the upper surface 185 and a new circle having, as one point on the circumference, a point (Ve) at which the vector $\vec{n2}$ expanded by θ5 from the vector $\vec{n}_{original}$ and an expanded surface of the upper surface 185 meet each other may be the padding area 183.

According to another embodiment, in the case of the side surface 187 of the cylinder 181, when it is assumed that the size of a padding area 184 is θ6, an area between the side surface 187 and the circumference on which the vector $\vec{n1}$ expanded by θ6 from the vector $\vec{n}_{original}$ and an expanded surface of the side surface 187 meet each other may be the padding area 184.

FIG. 15B illustrates FIG. 15A on an x-y plane to assist understanding.

Referring to FIG. 15B, the angle θ6 between the vectors $\vec{n1}$ and $\vec{n}_{original}$ is the size of the padding area 184 and the angle θ5 between the vectors $\vec{n2}$ and $\vec{n}_{original}$ is the size of the padding area 183. According to an embodiment, pixels values of the padding areas 183 and 184 may be pixel values of corresponding areas of the sphere.

In the aforementioned example, the method of setting the padding area of various stereoscopic or plane images to which a spatial image is mapped has been described in detail. The aforementioned embodiment can be applied to various stereoscopic or plane images as well as the aforementioned stereoscopic or plane images, and various methods of setting a padding area can be applied to the aforementioned stereoscopic or plane images.

Hereinafter, a method of defining the size of the padding area will be described in detail with reference to FIGS. 16A to 16E.

Figure 16A:
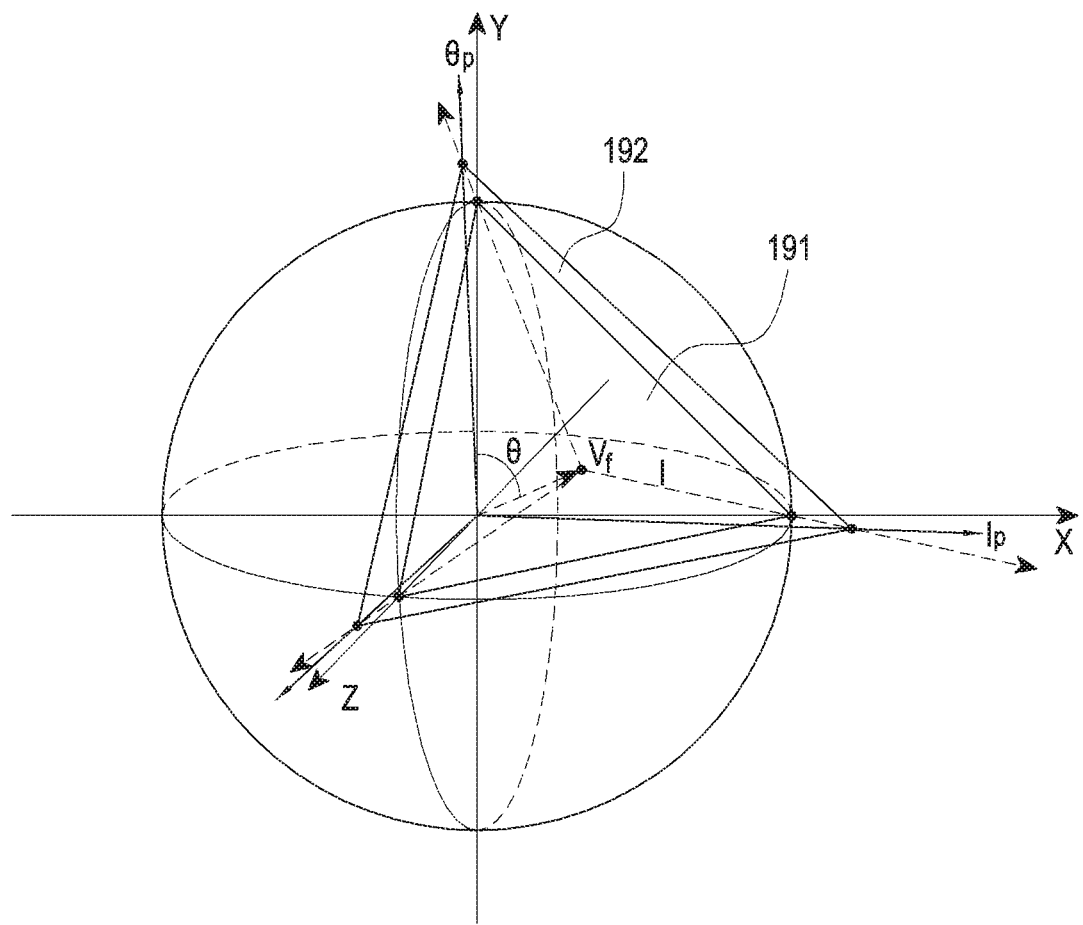
FIG. 16A illustrate a method of defining the size of a padding area according to various embodiments of the disclosure.

FIG. 16A illustrates a method of defining the size of a padding area according to various embodiments of the disclosure.

Figure 16B:
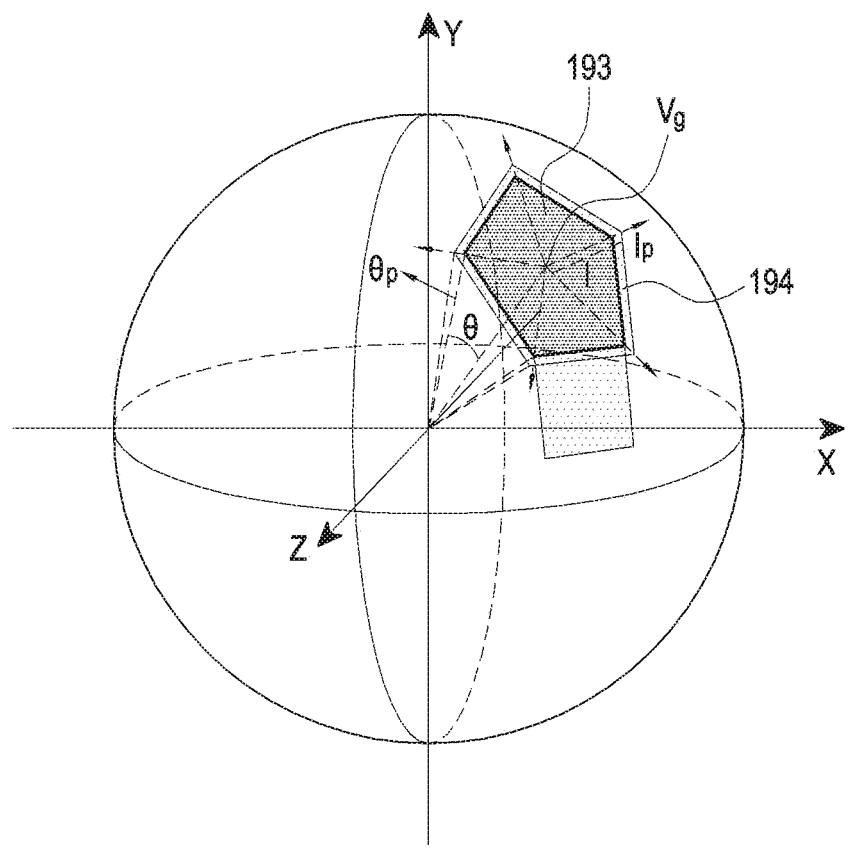
FIG. 16B illustrates a method of defining the size of a padding area according to various embodiments of the disclosure.
Figure 16C:
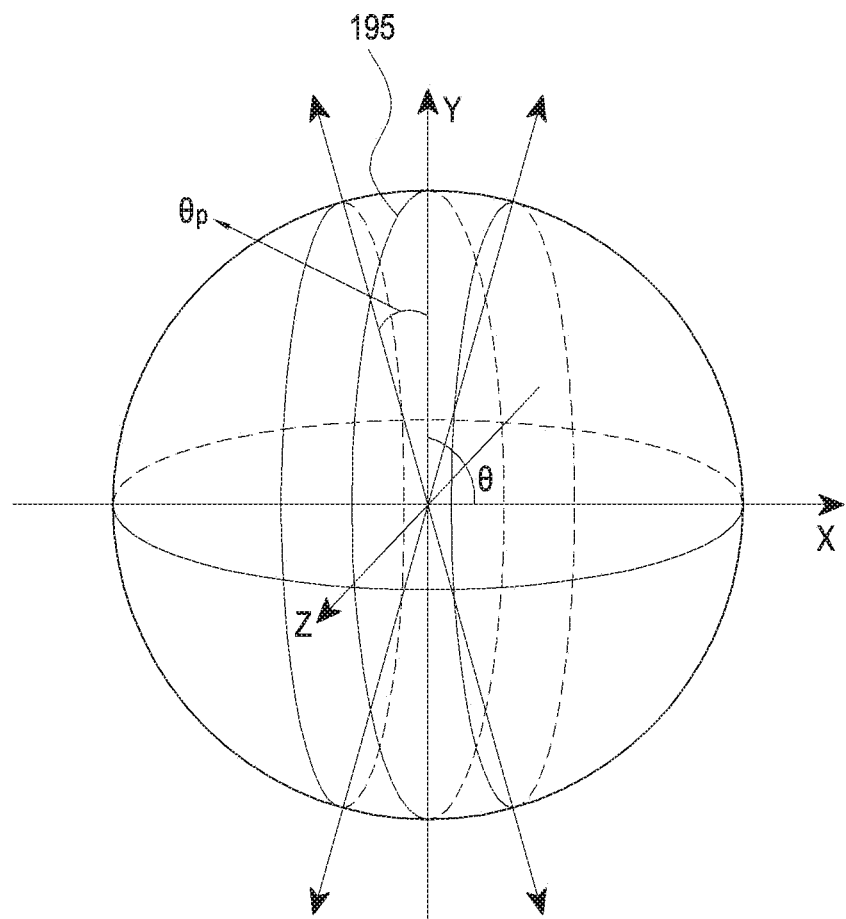
FIG. 16C illustrates a method of defining the size of a padding area according to various embodiments of the disclosure.
Figure 16D:
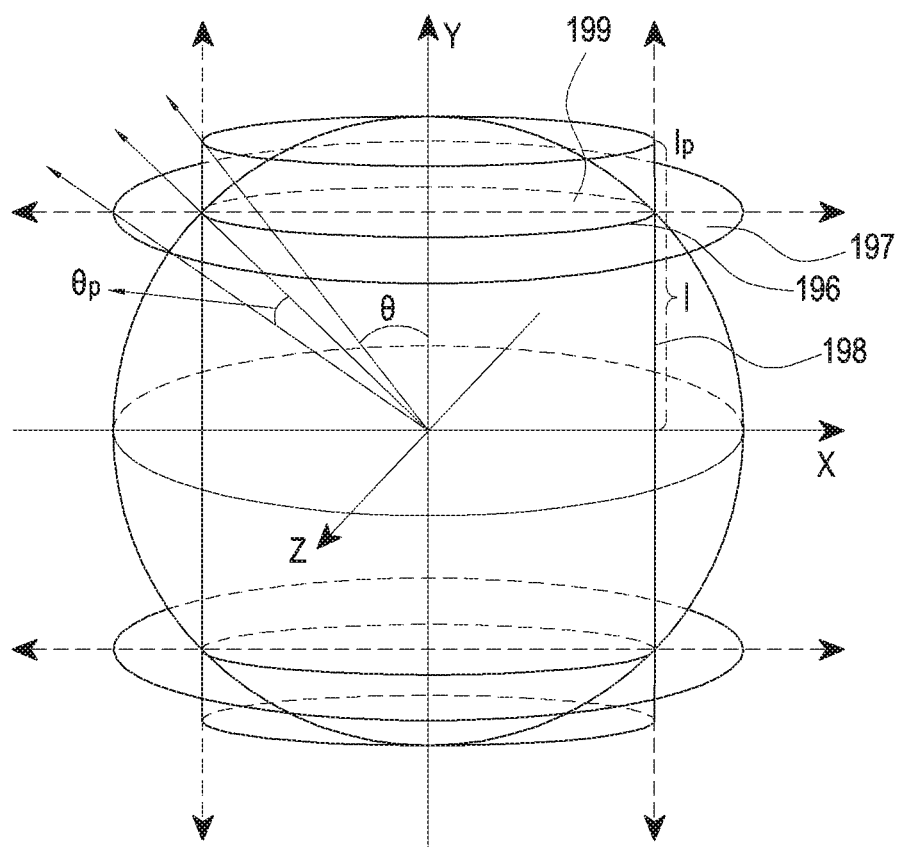
FIG. 16D illustrates a method of defining the size of a padding area according to various embodiments of the disclosure.
Figure 16E:
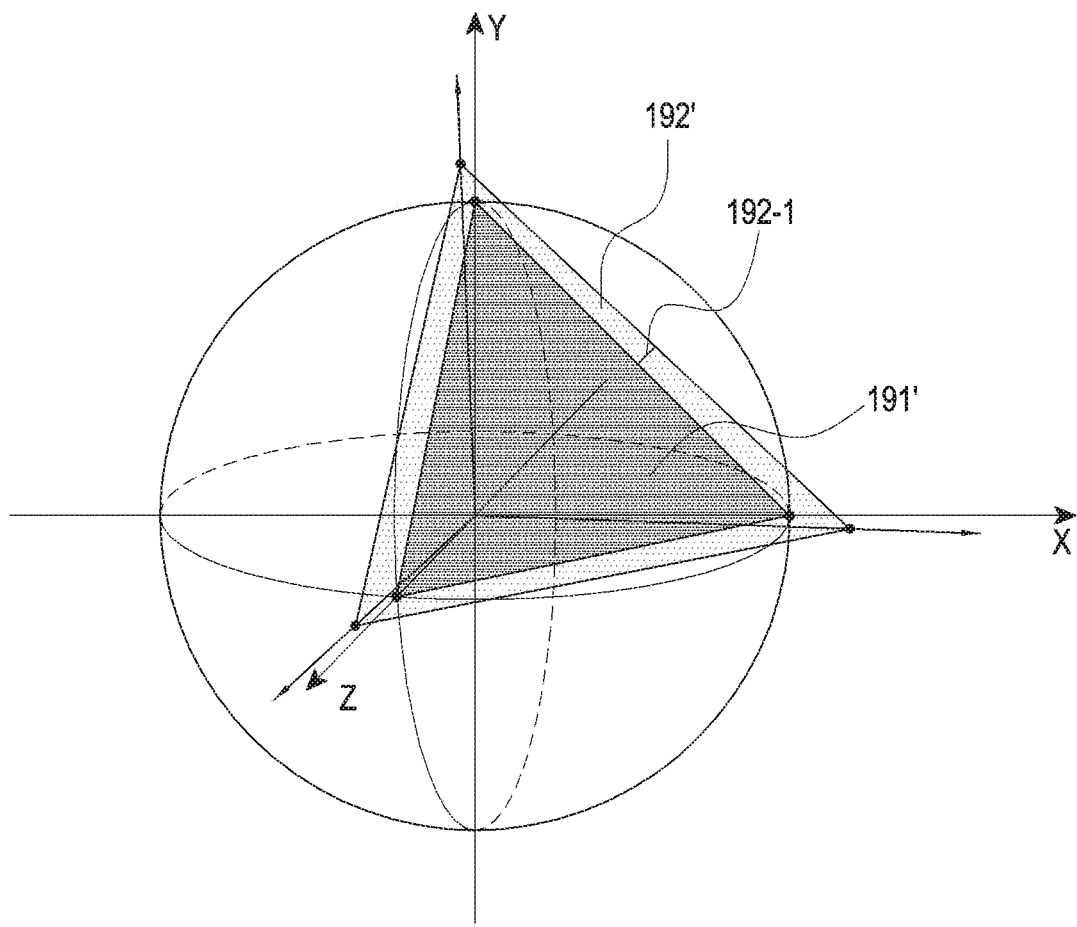
FIG. 16E illustrates a method of defining the size of a padding area according to various embodiments of the disclosure.

FIG. 16B illustrates a method of defining the size of a padding area according to various embodiments of the disclosure. FIG. 16C illustrates a method of defining the size of a padding area according to various embodiments of the disclosure. FIG. 16D illustrates a method of defining the size of a padding area according to various embodiments of the disclosure. FIG. 16E illustrates a method of defining the size of a padding area according to various embodiments of the disclosure.

The size of the padding area may be defined to be proportional to the size of an original image in which the padding area is set. The size of the original image may be the size of an angle or a length of the original image.

Referring to FIG. 16A, it is assumed that there is a padding area 192 corresponding to a triangular original image 191. In this case, when it is assumed that an angle from a normal vector having the origin of the original image 191 as a start point and having a central point (Vf) as an end point to a Y axis is θ and the size of the padding area 192 is an angle θp, the size θp of the padding area 192 may be defined to be proportional to the angle θ.

Referring to FIG. 16B, it is assumed that there is a padding area 194 corresponding to a pentagonal original image 193. The size θp of the padding area may be defined to be proportional to the angle θ from the central point of the original image 193 to one vertex of the original image 193.

Referring to FIG. 16C, the size θp of a padding area of a fisheye image 195 may be defined to be proportional to the angle θ between the X axis and the vertical axis of the fisheye image 195.

Referring to FIG. 16D, the size of a padding area 197 of an upper surface 196 of a cylinder may be defined as the angle θp. In this case, the angle θp may be defined to be proportional to the size of the angle θ between one point on the circumference of the upper surface 196 and the Y axis.

The size of a padding area 199 of a side surface 198 of cylinder may be defined as a length lp. In this case, the length lp may be defined to be proportional to the shortest distance l between one point at which the side surface 198 of the cylinder and the X axis meet each other and the upper surface 196.

In the aforementioned example, it has been described that the angle θp or the length lp may be proportional to the angle θ or the length l. In this case, θp=αθ, lp=$^α$l. α may vary depending on a mapped stereoscopic figure or image attributes. For example, α for a regular octahedron and α for a regular icosahedron may be different.

Meanwhile, in another method of setting a padding area, the size of the padding area may be defined as a predetermined size pixel.

Referring to FIG. 16E, the size of a padding area 192' may be defined as the number of pixels on a pixel line 192-1 expanded from a triangular original image area 191' in a perpendicular line direction.

According to an embodiment, the size of the pixel line 192-1 may be set as 4 to render the corresponding padding area 192' through a GPU without application of more coding (for example, encoding or decoding) to regular octahedron projection. In this case, Padding Pixel Size=Pixel Size for GPU interpolation. The GPU interpolation Pixel Size refers to the number of adjacent pixels used for bilinear interpolation when texture is mapped in a fragment shader of the GPU.

According to another embodiment, when the regular octahedron projection passes through a coding step, the size of the pixel line 192-1 may be set as a maximum macro block size (or a coding unit size) used for video coding) (Padding Pixel Size=γ*Max Macroblock Size (H.264, γ is a constant), Padding Pixel Size=γ*Max Coding Units Size (H.265, γ is a constant)). In this case, continuity between blocks may be guaranteed according to the set size of the pixel line 192-1.

According to another embodiment, the size of the pixel line 192-1 may be differently defined according to an amount (resolution) of information contained in the regular octahedron. For example, the size of the pixel line 192-1 may be differently defined in the case in which the resolution of one face of the regular octahedron is small and the case in which the resolution of one face of the regular octahedron is large (Padding Pixel Size=β*Image Resolution (β=$_{constant}$)).

As a result, the size of the padding area may be proportional to at least one of the sizes and the resolution of a face of a three-dimensional polyhedron corresponding to at least one of a plurality of mapped image areas.

In the aforementioned example, the regular octahedron has been described as an example for convenience of description, but the disclosure is not limited thereto and regular polyhedrons such as a regular tetrahedron and the embodiments of various mapping values can be applied.

In the embodiments of the padding scheme, the method of setting the image concatenated with the original image as the padding area in the original image has been described. As described above, as the image concatenated with the original image is set as the padding image in the original image, when a boundary between the original image and another original image is rendered, continuity between the original image and the other original image may be expressed more naturally and smoothly.

Further, as the size of the padding is set to be proportional to the size (for example, angle or length) or the resolution of the original image, the size of the padding area required for rendering the boundary between the original image and the other original image may be optimally set. The optimal size of the padding area may be set.

Meanwhile, the image processing device 500 may perform rendering using an input frame including a plurality of image areas in which a padding area is set. An embodiment of the image processing device 500 performing the rendering using the input frame will be described in detail with reference to a block diagram of FIG. 17. However, for convenience of description, the description that overlaps the image processing device 400' will be omitted.

Figure 17:
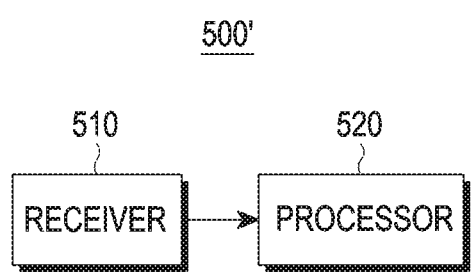
FIG. 17 is a block diagram illustrating an image processing device according to various embodiments of the disclosure.

FIG. 17 is a block diagram illustrating an image processing device according to various embodiments of the disclosure.

Referring to FIG. 17, an image processing device 500 according to an embodiment of the disclosure includes a receiver 510 and a processor 520.

The receiver 510 may receive an input frame including a plurality of image areas and metadata.

The processor 520 may render an output frame including at least part of the input frame on the basis of padding information included in the metadata. The padding information may include at least one piece of size information of a padding area included in at least one of a plurality of image areas and resolution information of at least one of a plurality of image areas.

The processor 520 may determine a padding area included in at least one of a plurality of image areas on the basis of padding information and render a boundary between at least one face of a polyhedron and another face of the polyhedron concatenated with the at least one face on the basis of the determined padding area. To this end, the metadata may further include arrangement attribute information indicating a mapping relation between each face of a three-dimensional polyhedron and each of a plurality of image areas.

The processor 520 may determine image areas corresponding to at least one face of a polyhedron among a plurality of image areas and another face of the polyhedron concatenated with the at least one face on the basis of the arrangement attributes and render an output frame including at least some of the faces of the polyhedron on the basis of the determined image areas.

According to an embodiment of rendering the boundary between image areas, when the resolution of at least one face of the polyhedron is higher than the resolution of another face different from the at least one face of the polyhedron, the processor 520 may set the size of an area used for rendering the boundary among padding areas included in the at least one face of the polyhedron to be larger than the size of an area used for rendering the boundary among padding areas included in the other area different from the at least one face of the polyhedron and render the boundary.

Figure 18A:
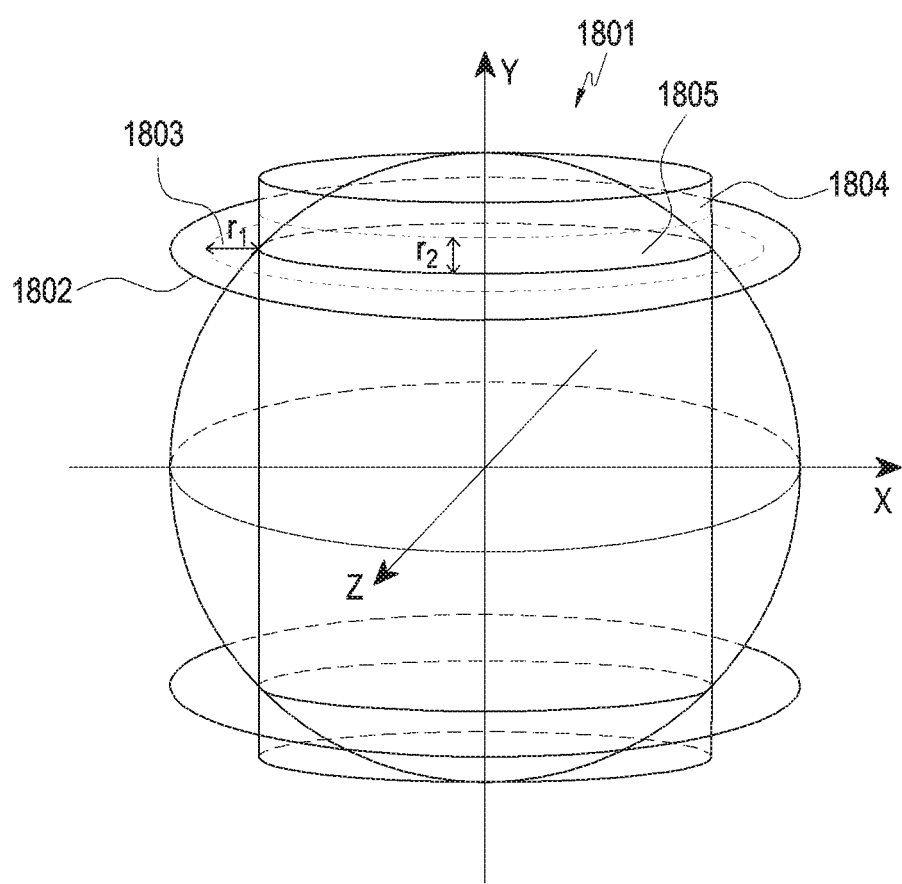
FIG. 18A illustrate a method of setting a boundary according to various embodiments of the disclosure.
Figure 18B:
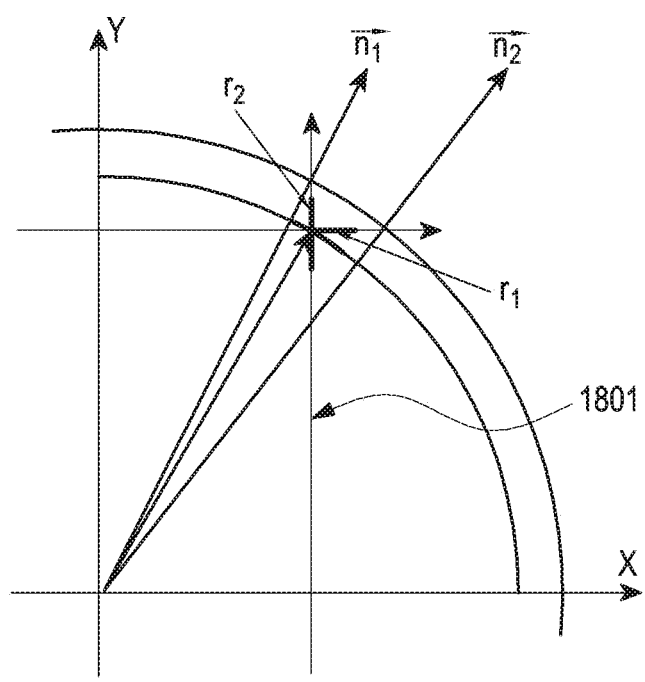
FIG. 18B illustrates a method of setting a boundary according to various embodiments of the disclosure.

FIG. 18A illustrates a method of setting a boundary according to various embodiments of the disclosure. FIG. 18B illustrates a method of setting a boundary according to various embodiments of the disclosure.

Referring to FIGS. 18A and 18B, an area 1803 indicated by a width r1 in a padding area 1802 on an upper surface of a cylinder 1801 and an area 1805 indicated by a width r2 in a padding area 1804 on a side surface of the cylinder 1801 may be defined as concatenated areas for a boundary. In this case, when it is assumed that the resolution of the upper surface is higher than the resolution of the side surface, the width r1 may be set to be larger than the width r2. Accordingly, it is possible to more naturally perform rendering by using a larger amount of padding information of an area having higher resolution.

Figure 19A:
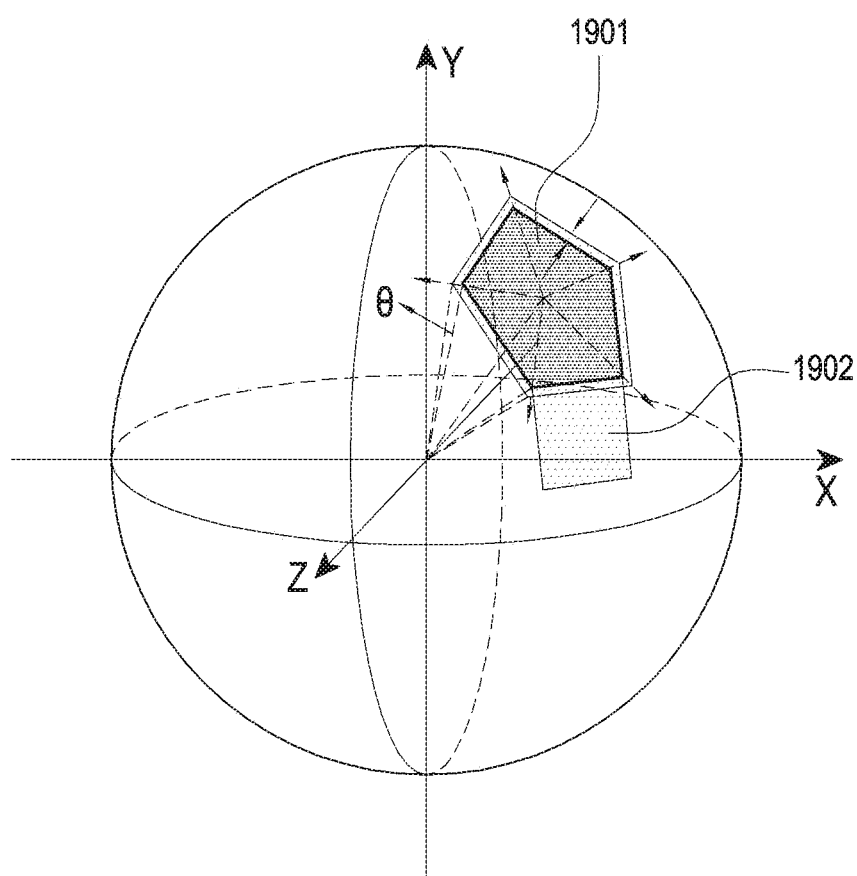
FIG. 19A illustrate a method of setting a boundary according to various embodiments of the disclosure.
Figure 19B:
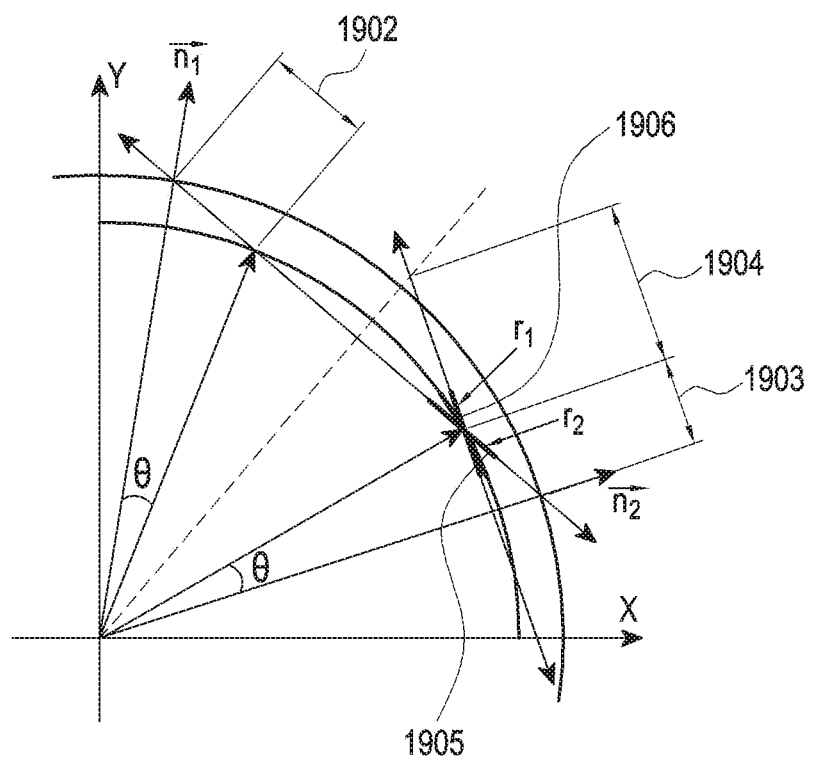
FIG. 19B illustrates a method of setting a boundary according to various embodiments of the disclosure.

FIG. 19A illustrates a method of setting a boundary according to various embodiments of the disclosure. FIG. 19B illustrates a method of setting a boundary according to various embodiments of the disclosure.

Referring to FIGS. 19A and 19B, a width of a concatenated area 1903 included in a padding area 1903 of a face 1901 of a regular pentagon is r2 and a width of a concatenated area 1904 included in a padding area 1904 of a face 1902 of a square is r1. In this case, when it is assumed that the resolution of the face 1901 (or the padding area 1903) of the regular pentagon is higher than the resolution of the face 1902 (or the padding area 1904) of the square, the width r2 may be set to be larger than the width r1.

As a result, by considering the resolution in rendering the boundary between one image area and another image area concatenated with the one image area, it is possible to more naturally render the boundary between the one image area and the other image area concatenated with the one image area.

Figure 20:
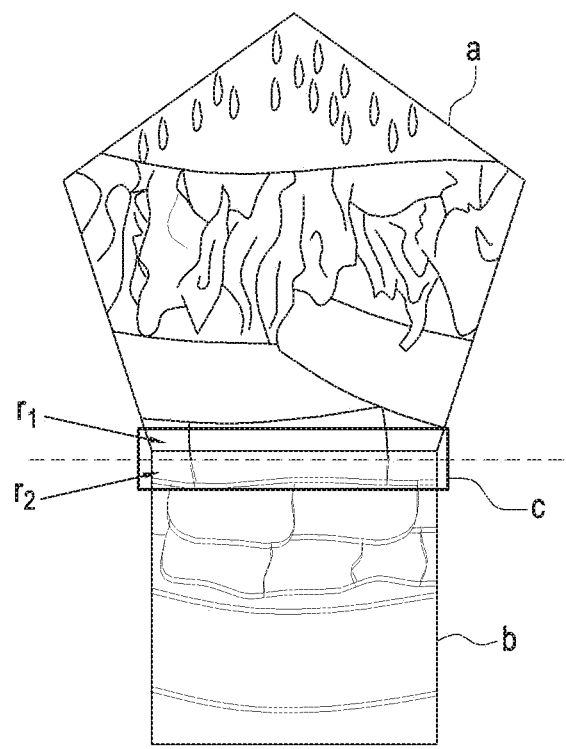
FIG. 20 illustrates a method of setting a boundary according to various embodiments of the disclosure.

FIG. 20 illustrates a method of setting a boundary according to various embodiments of the disclosure.

Referring to FIG. 20, when a high-resolution image area (a) and a low-resolution image area (b) are rendered, a concatenated area (r2) of the high-resolution image area (a) may be set to be larger than a concatenated area (r1) of the low-resolution image area (b) as shown in a total concatenated area (c). In this case, it is possible to perform natural rendering as illustrated in FIG. 20.

Figure 21:
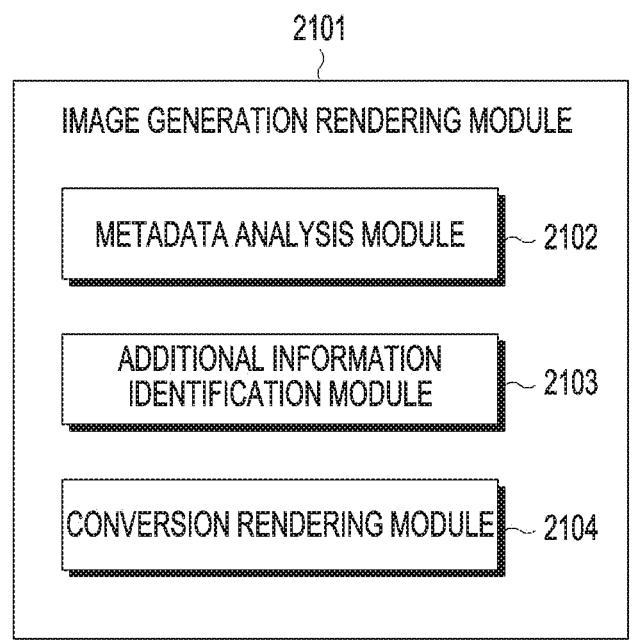
FIG. 21 is a block diagram illustrating an image generation rendering module according to various embodiments of the disclosure.

FIG. 21 is a block diagram illustrating an image generation rendering module according to various embodiments of the disclosure.

Referring to FIG. 21, an image generation rendering module 2101 may include a metadata configuration module 2102, an additional information identification module 2103, and a conversion rendering module 2104. The metadata configuration module 2102 may determine attributes of a polyhedron image map mapped in two-dimensions. The metadata may be preset data or data generated on the basis of information collected through the additional information identification module.

The additional information identification module 2103 may set different pieces of metadata for an area corresponding to at least one of a region of interest and a field of view and the remaining areas on the basis of at least one of region of interest information and field of view information.

The conversion rendering module 2104 may perform transcoding or rendering on the basis of the metadata.

In the aforementioned example, each element of the image generation rendering module 2101 may be stored in the storage unit and executed by the processor or may be implemented as separate hardware.

Figure 22:
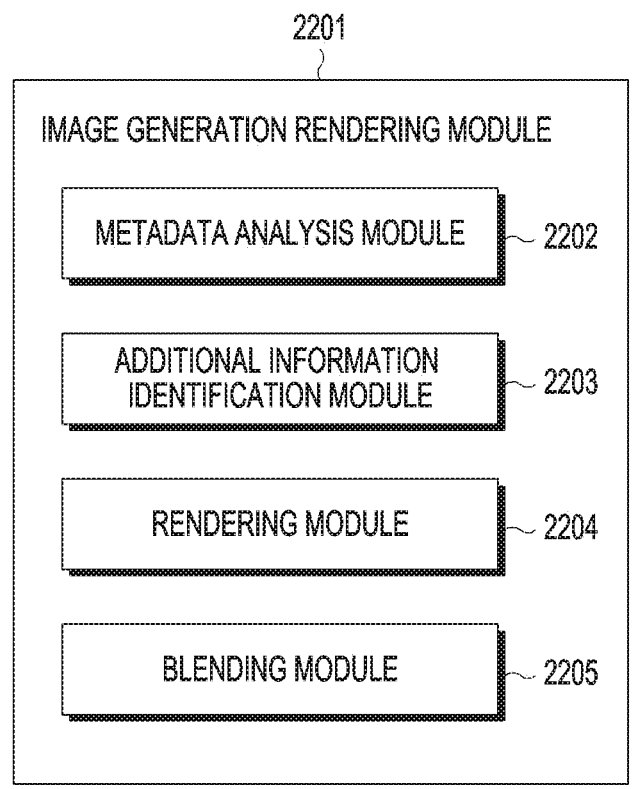
FIG. 22 is a block diagram illustrating an image rendering module according to various embodiments of the disclosure.

FIG. 22 is a block diagram illustrating an image rendering module according to various embodiments of the disclosure.

Referring to FIG. 22, an image rendering module 2201 includes a metadata analysis module 2202, an additional information identification module 2203, a rendering module 2204, and a blending module 2205.

The metadata analysis module 2201 may analyze, for example, at least one of a type of a polyhedron included in metadata, arrangement attributes of a two-dimensional image to which a polyhedron is mapped, and padding information.

The additional information identification module 2203 may analyze at least one of region of interest information and field of view information.

The rendering module 2204 may perform rendering on the basis of information analyzed by the metadata analysis module 2202. In this case, at least one piece of the region of interest information and the field of view information analyzed by the additional information identification module 2203 may be used.

The blending module 2205 may blend a boundary between images on the basis of padding information and blend a mapped texture.

Figure 23:
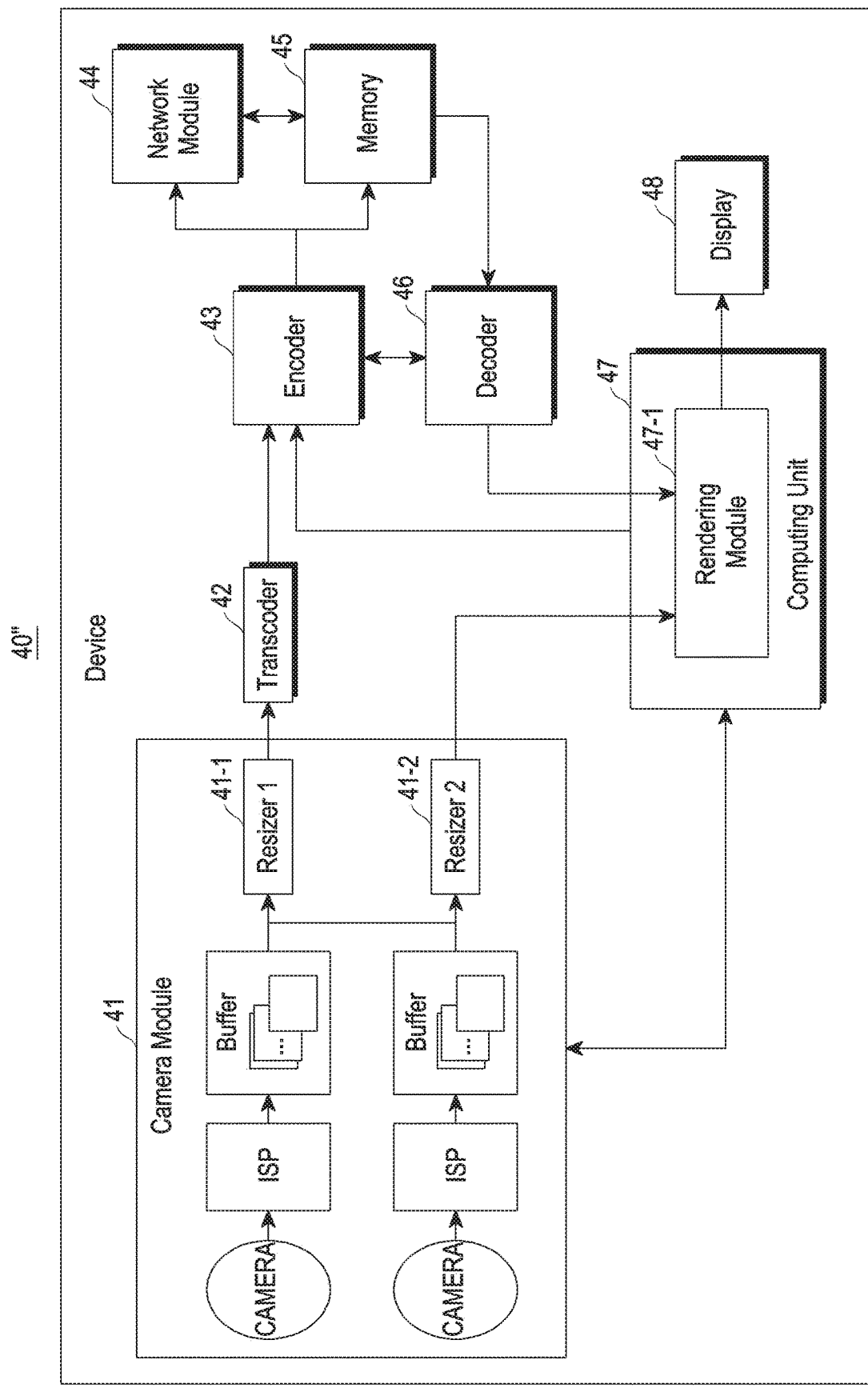
FIG. 23 is a block diagram illustrating an image processing system according to various embodiments of the disclosure.

FIG. 23 is a block diagram illustrating an image processing system according to various embodiments of the disclosure.

Referring to FIG. 23, an image processing system 40" is implemented as a single device (or image processing device).

For example, the camera module 41 may capture an omni-directional image. The captured image is transferred to resize #1 41-1 and resize #1 41-1 outputs the omni-directional image to the transcoder 42. The transcoder 41-1 maps the omni-directional image to a two-dimensional image using the OHP and transfers the two-dimensional image to the encoder 43. The encoder 43 transfers the mapped two-dimensional image to the network module 44 or the memory 45. The decoder 46 decodes the two-dimensional image stored in the memory 45 and transfers a rendering module 47-1 of a computing unit 47. The rendering module 47-1 (or the computing unit 47) transfers the rendered image to the display 48. The display 48 displays the rendered image. Meanwhile, resize #2 41-2 may control the size of the omni-directional image and transfer the omni-directional image to the rendering module 47-1 so as to provide a preview.

According to an embodiment, the rendered image and the preview image may be displayed together on the display 48 (through one or more of a picture-in-picture type and a picture-by-picture type).

According to an embodiment, the rendered image and the preview image may be independently displayed on different displays. For example, an image related to a fisheye image captured through a fisheye lens may be displayed on a first display as a preview and a rendered image may be displayed on a second display.

According to various embodiments, an area of the omni-directional image corresponding to a preview area may be determined and an image rendered in connection with the area may be displayed on the display 48.

For example, the preview area may be set as a FoV, and an image related to an area of the omni-directional image pertaining to the corresponding FoV may be rendered and displayed on the display.

According to various embodiments, the rendering module 47-1 (or the computing unit 47) may control the size of only an image received through a predetermined camera among a plurality of cameras included in a camera system for capturing omni-directional images and then provide the image as a preview image.

According to various embodiments, resize #2 41-2 may detect generation of an event, control the size an area designated among the omni-directional images on the basis of the event, and then provide the image as a preview image.

For example, the rendering module 47-1 (or the computing unit 47) may set a FoV among the omni-directional images on the basis of orientation (for example, a display orientation direction or an opposite direction) of the display 48 and provide the FoV as a preview image. That is, when a preview direction is set by a user input (for example, a touch, a gesture, or a voice input) in the same direction as the display, it is easy to control selfie to be included in the omni-directional image and to identify the result.

Accordingly, when motion of the device is detected, the FoV may be changed on the basis thereof. For example, when an audio input is generated, the rendering module 47-1 (or the computing unit 47) may determine audio directivity, set an FoV among omni-directional images on the basis of a direction in which the audio data is generated (for example, determine with one or more microphones adjacent to the direction in which the audio data is generated among a plurality of microphones mounted to the device 40 on the basis of volumes received by each microphone), and provide the FoV area as a preview image. According to the embodiment, the rendered image and the preview image may independently display different areas.

Figure 24:
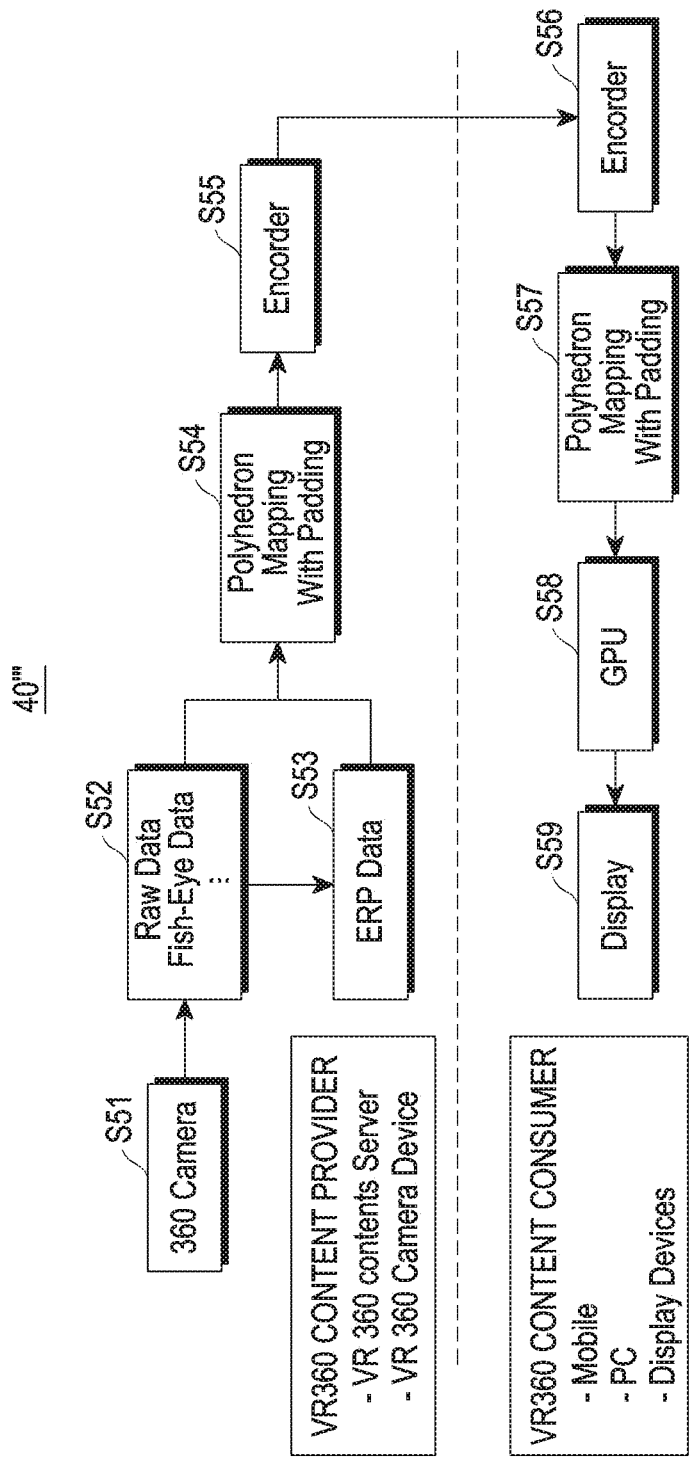
FIG. 24 is a block diagram illustrating an image processing system according to various embodiments of the disclosure.

FIG. 24 is a block diagram illustrating an image processing system according to various embodiments of the disclosure.

Referring to FIG. 24, a VR 360 content provider (for example, a VR 360 content server or a VR 360 camera) may process images in the following order. First, the 360 camera may capture omni-directional images in S51. In this case, the omni-directional images may be fisheye images in S52. The fisheye image may be mapped to an ERP image in S53. The fisheye image or the ERP image may be mapped to a polyhedron and then mapped to a two-dimensional image in S54 (transcoding step). The mapped polyhedron may be encoded in S55 (for example, JPG or MPG) and the encoded image may be stored in the storage unit or may be transmitted to another external device (for example, a VR 360 content consumer described below).

The VR 360 content consumer (for example, a mobile device, a Personal Computer (PC), or a display device) may process at least one image received from the VR content provider in the following order.

First, a data stream corresponding to at least one image received from at least one channel is decoded in S56. The at least one decoded image may be mapped to a polyhedron in S57 and the mapped polyhedron may be rendered by a GPU and displayed in S58 and S59. In this case, the mapping of the polyhedron may be performed using metadata received together with at least one image. The metadata may include a type of a polyhedron, a sub type indicating arrangement attributes of at least one image in a frame, and geometry information including a mapping relation between at least one image and a polyhedron.

According to an embodiment, the metadata may be transmitted using EssentialProperty@value defined in DASH or transmitted while being defined in a SupplementalProperty@value parameter, and representation of the metadata may be expressed as, for example, <EssentialPropertyschemeIdUri="urn:mpeg:dash:vrd:2016" value="0,8,1,0,3"/>. Further, a boundary between a plurality of images may be rendered using padding information (for example, the size or the resolution of the padding area) included in the metadata.

Figure 25:
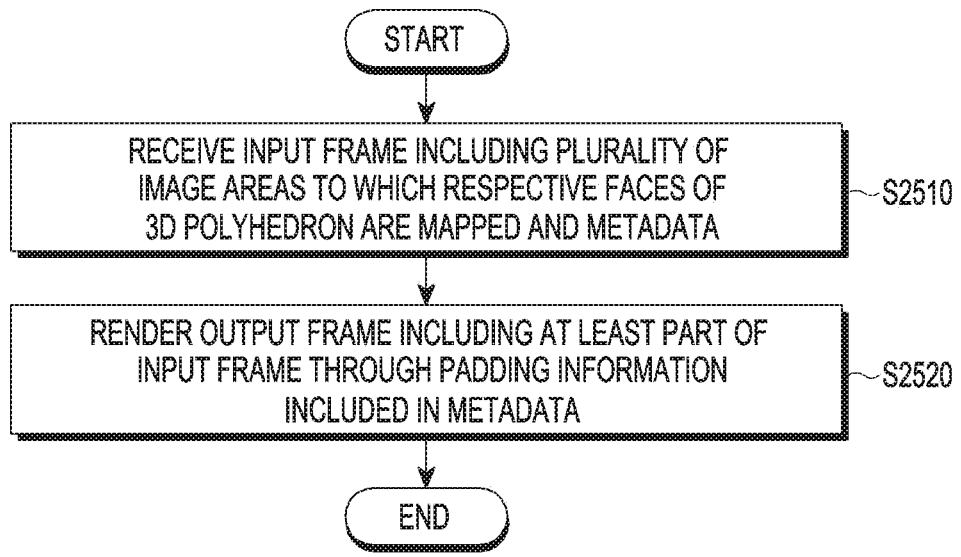
FIG. 25 is a flowchart illustrating an image processing method according to various embodiments of the disclosure.

FIG. 25 is a flowchart illustrating an image processing method according to various embodiments of the disclosure.

First, an image processing method according to various embodiments of the disclosure may include a process of receiving an input frame including a plurality of image areas to which respective faces of a three-dimensional polyhedron are mapped and metadata in S2510 and a process of rendering an output frame including at least part of the input frame on the basis of padding information included in the metadata in S2520. In this case, the rendering process may include determining a padding area included in at least one of the plurality of image areas on the basis of the padding information and rendering a boundary between at least one face of the polyhedron and another face of the polyhedron concatenated with the at least one face on the basis of the determined padding area.

In this case, the metadata may further include arrangement attribute information indicating a mapping relation between each face of the three-dimensional polyhedron and each of the plurality of image areas, and the rendering process may include determining image areas corresponding to a least one face of the polyhedron among the plurality of image areas and another face of the polyhedron concatenated with the at least one face on the basis of the arrangement attribute information and rendering the output frame including at least some of the faces of the polyhedron on the basis of the determined image areas.

Further, the padding information may include at least one piece of size information of a padding area included in at least one of the plurality of image areas and resolution information of at least one of the plurality of image areas.

The rendering method may include, when a resolution of at least one face of the polyhedron is higher than a resolution of another face different from the at least one face of the polyhedron, setting a size of an area used for rendering the boundary among padding areas included in the at least one face of the polyhedron to be larger than a size of an area used for rendering the boundary among the padding areas included in the another face different from the at least one face of the polyhedron and rendering the boundary.

Meanwhile, the size of the padding area may be proportional to at least one of a size and a resolution of the polyhedron corresponding to at least one of the plurality of image areas.

Figure 26:
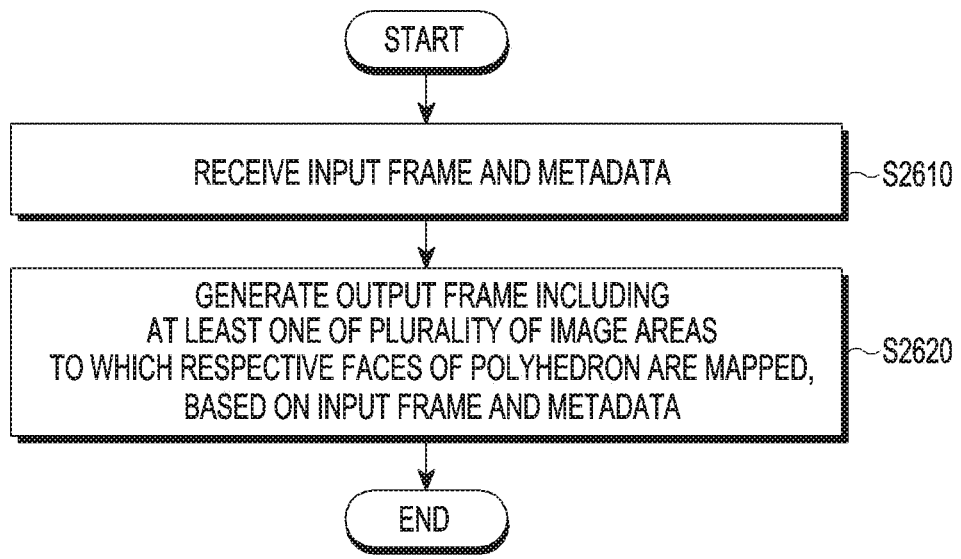
FIG. 26 is a flowchart illustrating an image processing method according to various embodiments of the disclosure.

FIG. 26 is a flowchart illustrating an image processing method according to various embodiments of the disclosure.

First, an image processing method according to various embodiments of the disclosure may include receiving an input frame and metadata in S2610 and generating an output frame including at least one of a plurality of image areas to which images of respective faces of a polyhedron are mapped on the basis of the input frame and the metadata in S2620. The generating process may include generating at least one padding area, based on padding information included in the metadata and inserting the at least one generated padding area into at least one of the plurality of image areas to generate the output frame.

In this case, the metadata may further include arrangement attribute information indicating a mapping relation between each face of the polyhedron and each of the plurality of image areas, and the generating process may include mapping the images of the respective faces of the polyhedron to the plurality of image areas, based on the arrangement attribute information.

Further, the padding information may include at least one piece of size information of a padding area included in at least one of the plurality of image areas and resolution information of at least one of the plurality of image areas.

Meanwhile, the size of the padding area may be proportional to at least one of a size and a resolution of the polyhedron corresponding to at least one of the plurality of image areas.

Meanwhile, the image processing method according to various embodiments of the disclosure may be provided to each server or devices to be executed by a processor while being implemented by a computer-executable program code and stored in various non-transitory computer-readable media.

A non-transitory computer-readable medium storing a program for performing a process of receiving an input frame including a plurality of image areas corresponding to respective faces of a three-dimensional polyhedron and metadata and a process of rendering an output frame including at least part of the input frame, based on padding information included in the metadata may be provided. The rendering process may include determining a padding area included in at least one of the plurality of image areas, based on the padding information and rendering a boundary between at least one face of the polyhedron and another face of the polyhedron concatenated with the at least one face on the basis of the determined padding area In another example, a non-transitory computer-readable medium storing a program for performing a process of receiving an input frame and metadata and a process of generating an output frame including at least one of a plurality of image areas to which images of respective faces of a polyhedron are mapped on the basis of the input frame and the metadata may be provided. The generating process may include generating at least one padding area, based on padding information included in the metadata and inserting the at least one generated padding area into at least one of the plurality of image areas to generate the output frame.

A non-transitory computer-readable medium refers to a medium which semi-permanently stores data and can be read by a device rather than a medium which stores data for a short time, such as register, cache, or memory. Specifically, the aforementioned various applications or programs may be provided while being stored in a non-transitory computer-readable medium, such as a CD, a DVD, a hard disc, a blu-ray disc, a USB, a memory card, or a ROM.

Although specific exemplary embodiments of the disclosure have been illustrated and described, it should be appreciated that the disclosure is not limited thereto. It will be apparent that various modifications and changes may be made by those skilled in the art without departing from the scope of the disclosure as defined by the appended claims, and these modifications and changes should not be construed separately from the technical idea or view of the disclosure.

The invention claimed is:

1. An apparatus for processing an image, the apparatus comprising:
   a communication circuit configured to receive an input frame including a plurality of image areas corresponding to respective faces of a polyhedron and metadata; and
   a processor configured to render an output frame including at least part of the input frame, based on padding information included in the metadata,
   wherein the processor is configured to:
      determine a padding area included in at least one of the plurality of image areas, based on the padding information, and
      render a boundary between at least one face of the polyhedron and another face of the polyhedron concatenated with the at least one face, based on the determined padding area,
   wherein the padding information includes at least one piece of size information of a padding area included in at least one of the plurality of image areas and resolution information of at least one of the plurality of image areas, and wherein, when a resolution of the at least one face of the polyhedron is higher than a resolution of the another face different from the at least one face of the polyhedron, the processor sets a size of an area used for rendering a boundary among padding areas included in the at least one face of the polyhedron to be larger than a size of an area used for rendering a boundary among the padding areas included in the another face different from the at least one face of the polyhedron and renders the boundary among the padding areas included in the at least one face.

2. The apparatus of claim 1,
wherein the metadata further includes arrangement attribute information indicating a mapping relation between the respective faces of the polyhedron and each of the plurality of image areas, and
wherein the processor is configured to:
  determine image areas corresponding to a least one face of the polyhedron among the plurality of image areas and another face of the polyhedron concatenated with the at least one face based on the arrangement attribute information, and
  render the at least one face of the polyhedron and the another face of the polyhedron concatenated with the at least one face of the polyhedron based on the determined image areas.

3. An apparatus for processing an image, the apparatus comprising:
a memory configured to store an input frame and metadata; and
a processor configured to:
  generate an output frame including at least one of a plurality of image areas to which images of respective faces of a polyhedron are mapped, based on the input frame and the metadata and control the memory to store the generated output frame,
  generate at least one padding area, based on padding information included in the metadata, and
  insert the at least one generated padding area into at least one of the plurality of image areas to generate the output frame,
wherein the padding information includes at least one piece of size information of a padding area included in at least one of the plurality of image areas and resolution information of at least one of the plurality of image areas, and
wherein, when a resolution of at least one face of the polyhedron is higher than a resolution of another face different from the at least one face of the polyhedron, the processor sets a size of an area used for rendering a boundary among padding areas included in the at least one face of the polyhedron to be larger than a size of an area used for rendering a boundary among the padding areas included in the another face different from the at least one face of the polyhedron and renders the boundary among the padding areas included in the at least one face.

4. The apparatus of claim 3, wherein the metadata further includes arrangement attribute information indicating a mapping relation between the respective faces of the polyhedron and each of the plurality of image areas, and the processor maps the images of the respective faces of the polyhedron to the plurality of image areas, based on the arrangement attribute information.

5. A method of processing an image, the method comprising:

receiving an input frame including a plurality of image areas corresponding to respective faces of a polyhedron and metadata; and
rendering an output frame including at least part of the input frame, based on padding information included in the metadata,
wherein the rendering of the output frame comprises:
  determining a padding area included in at least one of the plurality of image areas, based on the padding information; and
  rendering a boundary between at least one face of the polyhedron and another face of the polyhedron concatenated with the at least one face, based on the determined padding area,
wherein the padding information includes at least one piece of size information of a padding area included in at least one of the plurality of image areas and resolution information of at least one of the plurality of image areas, and
wherein the rendering of the output frame comprises:
  when a resolution of the at least one face of the polyhedron is higher than a resolution of the another face different from the at least one face of the polyhedron, setting a size of an area used for rendering a boundary among padding areas included in the at least one face of the polyhedron to be larger than a size of an area used for rendering a boundary among the padding areas included in the another face different from the at least one face of the polyhedron and rendering the boundary among the padding areas included in the at least one face of the polyhedron.

6. The method of claim 5,
wherein the metadata further includes arrangement attribute information indicating a mapping relation between the respective faces of the polyhedron and each of the plurality of image areas, and
wherein the rendering of the output frame comprises:
  determining image areas corresponding to a least one face of the polyhedron among the plurality of image areas and another face of the polyhedron concatenated with the at least one face based on the arrangement attribute information; and
  rendering the at least one face of the polyhedron and the another face of the polyhedron concatenated with the at least one face of the polyhedron based on the determined image areas.

7. A method of processing an image, the method comprising:
receiving an input frame and metadata; and
generating an output frame including at least one of a plurality of image areas to which images of respective faces of a polyhedron are mapped, based on the input frame and the metadata,
wherein the generating comprises generating at least one padding area, based on padding information included in the metadata and inserting the at least one generated padding area into at least one of the plurality of image areas to generate the output frame,
wherein the padding information includes at least one piece of size information of a padding area included in at least one of the plurality of image areas and resolution information of at least one of the plurality of image areas, and
wherein the generating of the at least one padding area comprises:
  when a resolution of the at least one face of the polyhedron is higher than a resolution of another face different from the at least one face of the polyhedron, setting a size of an area used for rendering a boundary among padding areas included in the at least one face of the polyhedron to be larger than a size of an area used for rendering a boundary among the padding areas included in the another face different from the at least one face of the polyhedron and rendering the boundary among the padding areas included in the at least one face of the polyhedron.

* * * * *